(12) United States Patent
Ichihashi et al.

(10) Patent No.: US 10,139,533 B2
(45) Date of Patent: Nov. 27, 2018

(54) CIRCULAR POLARIZING FILTER AND APPLICATION THEREOF

(71) Applicant: FUJIFILM Corporation, Tokyo (JP)

(72) Inventors: Mitsuyoshi Ichihashi, Ashigarakami-gun (JP); Wataru Majima, Ashigarakami-gun (JP); Kazuhiro Oki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 331 days.

(21) Appl. No.: 15/014,640

(22) Filed: Feb. 3, 2016

(65) Prior Publication Data

US 2016/0154156 A1    Jun. 2, 2016

Related U.S. Application Data

(63) Continuation of application No. PCT/JP2014/071846, filed on Aug. 21, 2014.

(30) Foreign Application Priority Data

Aug. 21, 2013 (JP) .................. 2013-171483
Aug. 21, 2013 (JP) .................. 2013-171484

(51) Int. Cl.
*G01J 4/04* (2006.01)
*G02B 5/30* (2006.01)
(Continued)

(52) U.S. Cl.
CPC .............. *G02B 5/3016* (2013.01); *G01J 4/04* (2013.01); *G02B 27/286* (2013.01); *G01J 2004/001* (2013.01); *G02B 27/283* (2013.01)

(58) Field of Classification Search
CPC ....................................... G01J 4/04
See application file for complete search history.

(56) References Cited

U.S. PATENT DOCUMENTS 5,150,234 A * 9/1992 Takahashi ................ G02B 3/14
349/1
6,166,790 A    12/2000 Kameyama et al.
(Continued)

FOREIGN PATENT DOCUMENTS

JP    11-194217 A    7/1999
JP    2003-228038 A    8/2003
(Continued)

OTHER PUBLICATIONS

Yoshida et al., "Tunable single photonic defect-mode in cholesteric liquid crystals with laser-induced local modifications of helix," Appl. Phs. Letter, vol. 89, No. 231913, pub. 2006; Retrieved from internet [Feb. 19, 2018]; Retrieved from url <https:doi.org/10.1063/1.24000070>.*

(Continued)

*Primary Examiner* — Yara B Green
(74) *Attorney, Agent, or Firm* — Birch, Stewart, Kolasch & Birch, LLP

(57) ABSTRACT

According to the invention, there is provided a circular polarizing filter for selectively transmitting circularly polarized light of any one sense of either right-handed circularly polarized light or left-handed circularly polarized light at a specific wavelength in which scattering transmittance/vertical transmittance when circularly polarized light of the sense of the specific wavelength enters from any one surface is less than scattering reflectance/regular reflectance when circularly polarized light of the other sense enters from the surface. The circular polarizing filter includes a circularly-polarized light separating layer, the circularly-polarized light separating layer includes a reflected light-scattering circularly-polarized light separating layer, and may further include a reflected light-non-scattering circularly-polarized light separating layer, the reflected light-scattering circularly-polarized light separating layer is composed of a layer (Continued)

having a cholesteric liquid crystalline phase fixed therein, and the reflected light-non-scattering circularly-polarized light separating layer is composed of a layer having a cholesteric liquid crystalline phase fixed therein, or a laminate including a linearly-polarized light separating layer and a λ/4 phase difference layer. The circular polarizing filter of the invention has a high circular polarizance, and a high-sensitivity sensor system can be provided using the circular polarizing filter of the invention.

20 Claims, 3 Drawing Sheets

(51) Int. Cl.
    *G02B 27/28*          (2006.01)
    *G01J 4/00*           (2006.01)

(56) References Cited

U.S. PATENT DOCUMENTS

| | | | |
|---|---|---|---|
| RE38,500 E | 4/2004 | Kameyama et al. | |
| 8,968,836 B2 | 3/2015 | Hamada et al. | |
| 2006/0078692 A1* | 4/2006 | Murakami | G02B 5/3016 428/1.31 |
| 2006/0083866 A1* | 4/2006 | Hanelt | G02B 5/3016 428/1.1 |
| 2009/0059158 A1* | 3/2009 | Umeya | G02B 5/0236 349/193 |
| 2012/0242948 A1* | 9/2012 | Taguchi | G02B 5/26 349/191 |
| 2013/0107193 A1* | 5/2013 | Hamada | G02B 5/3016 349/193 |
| 2014/0022493 A1* | 1/2014 | Hoshino | G09F 3/0294 349/86 |
| 2014/0041296 A1 | 2/2014 | Ichihashi et al. | |

FOREIGN PATENT DOCUMENTS

| | | |
|---|---|---|
| JP | 2007-163894 A | 6/2007 |
| JP | 2008-83010 A | 4/2008 |
| JP | 2013-36888 A | 2/2013 |
| JP | 2013-109220 A | 6/2017 |
| WO | WO 2007/069781 A1 | 6/2007 |
| WO | WO 2012/014552 A1 | 2/2012 |
| WO | WO 2012/144422 A1 | 10/2012 |

OTHER PUBLICATIONS

International Preliminary Report on patentability for PCT/JP2014/071846 (PCT/IPEA/409) dated Sep. 8, 2015.
International Search Report for PCT/JP2014/071846 (PCT/ISA/210) dated Nov. 25, 2014.
Written Opinion of the International Searching Authority for PCT/JP2014/071846 (PCT/ISA/237) dated Nov. 25, 2014.
Japanese Office Action dated Jan. 10, 2017, for Japanese Application No. 2015-532888, with English machine translation.
English translation of the International Preliminary Report on Patentability (Forms PCT/IB/338 and PCT/IPEA/409), dated Feb. 25, 2016, for International Application No. PCT/JP2014/071846.
Chinese Office Action with English translation, dated May 24, 2017, issued in Chinese Patent Application No. 201480043942.6.
Notification of Reasons for Refusal with English translation, dated Aug. 30, 2017, issued in corresponding Japanese Patent application No. 2015-532888.
Japanese Decision of Refusal, dated Apr. 3, 2018, for corresponding Japanese Application No. 2015-532888, with an English machine translation.
Japanese Decision to Decline the Amendment, dated Apr. 3, 2018, for corresponding Japanese Application No. 2015-532888, with an English machine translation.

* cited by examiner

CIRCULAR POLARIZING FILTER AND APPLICATION THEREOF

CROSS-REFERENCE TO RELATED APPLICATIONS

This application is a continuation of PCT International Application No. PCT/JP2014/071846 filed on Aug. 21, 2014, which claims priorities under 35 U.S.C § 119 (a) to Japanese Patent Applications Nos. 2013-171483 and 2013-171484 filed on Aug. 21, 2013, the entire contents of which are incorporated herein by reference.

BACKGROUND OF THE INVENTION

1. Field of the Invention

The present invention relates to a circular polarizing filter. In addition, the present invention relates to the application of a circular polarizing filter to a light source, a sensor, a sensor system, or the like.

2. Description of the Related Art

Circular polarizing filters are filters capable of selectively transmitting or reflecting either right-handed circularly polarized light or left-handed circularly polarized light in a specific wavelength region, and are applied in various fields by utilizing characteristics of the obtained circularly polarized light.

For example, WO2012/144422A discloses usage of circularly polarized light in plant cultivation, and using a circular polarization plate in a lighting device for plant cultivation is described therein.

JP2013-36888A discloses an inspection system using circularly polarized light. JP2013-36888A discloses a technology of detecting cracks of a silicon substrate using a system which irradiates the silicon substrate with circularly polarized infrared light via a circular polarizing filter and receives reflected or transmitted light from the silicon substrate via the circular polarizing filter. This technology uses the fact that reflected or transmitted light from a portion having no cracks is circularly polarized light of the opposite sense and cannot be transmitted through the circular polarizing filter, but in the case of reflected or transmitted light from a crack, light which can be detected via the circular polarizing filter by diffuse reflection is generated.

SUMMARY OF THE INVENTION

An object of the invention is to provide a circular polarizing filter capable of providing circularly polarized light with a high circular polarizance, or a circular polarizing filter allowing an improvement in sensitivity in a sensor system using circularly polarized light. Particularly, an object of the invention is to provide a circular polarizing filter which uses a layer having a cholesteric liquid crystalline phase fixed therein and has the above-described characteristics. In addition, an object of the invention is to provide a high-sensitivity sensor system using circularly polarized light.

A layer which is uniformly aligned such that the helical axis of a cholesteric liquid crystalline phase formed of a cholesteric liquid crystal compound is perpendicular to a cell substrate or a surface of a support is generally known to function as a circularly-polarized light-selective polarizing filter.

However, when the inventors of the invention actually measured the polarization characteristics of transmitted light carefully, it was not possible to achieve completely circularly polarized light even in a cholesteric film having extremely high alignment uniformity. In addition, it was also found that the circular polarizance is reduced when cover glass for protecting the filter is disposed on the transmitted light side of the filter.

The inventors of the invention have repeated intensive studies to improve the circular polarizance based on this knowledge, and have found that the circular polarizance of transmitted light is improved in a light-scattering cholesteric liquid crystal layer thought to have a reduced polarizance. Hitherto, means used to improve circular polarization characteristics of a cholesteric film has been intended to extremely reduce foreign substances and liquid crystal alignment defects which cause a reduction in the circular polarization, and to provide a uniform alignment state with no defects, and thus the above finding was an amazing discovery.

The inventors of the invention have further repeated studies based on this knowledge, and have completed the invention.

That is, the invention provides the following [1] to [21].

[1] A circular polarizing filter for selectively transmitting circularly polarized light of any one sense of either right-handed circularly polarized light or left-handed circularly polarized light at a specific wavelength, including a circularly-polarized light separating layer which selectively transmits circularly polarized light of any one sense of either right-handed circularly polarized light or left-handed circularly polarized light, and selectively reflects circularly polarized light of the other sense at the specific wavelength, in which the circularly-polarized light separating layer includes a reflected light-scattering circularly-polarized light separating layer, the reflected light-scattering circularly-polarized light separating layer is composed of a layer having a cholesteric liquid crystalline phase fixed therein, and scattering transmittance/vertical transmittance when circularly polarized light of such a sense as to be selectively transmitted at the specific wavelength enters from any one surface is less than scattering reflectance/regular reflectance when circularly polarized light of the other sense enters from the surface at the specific wavelength.

[2] The circular polarizing filter according to [1], in which the reflected light-scattering circularly-polarized light separating layer has alignment defects of the cholesteric liquid crystalline phase therein, and the scattering transmittance/vertical transmittance of the circularly polarized light of the sense at the specific wavelength is less than the scattering reflectance/regular reflectance of circularly polarized light of the other sense.

[3] The circular polarizing filter according to [1] or [2], in which the scattering transmittance/vertical transmittance when circularly polarized light of such a sense as to be selectively transmitted at the specific wavelength enters from any one surface is 0.00 to 0.10, and the scattering reflectance/regular reflectance when circularly polarized light of the other sense enters from the surface at the specific wavelength is 2.0 to 7.5.

[4] The circular polarizing filter according to any one of [1] to [3], in which in the reflected light-scattering circularly-polarized light separating layer, the scattering transmittance/vertical transmittance of circularly polarized light of such a sense as to be selectively transmitted at the specific wavelength is 0.00 to 0.10, and the scattering reflectance/ regular reflectance of circularly polarized light of the other sense at the specific wavelength is 2.0 to 7.5.

[5] The circular polarizing filter according to any one of [1] to [4], in which in the reflected light-scattering circularly-polarized light separating layer, a haze value measured using natural light of the specific wavelength is greater than 10 to 55.

[6] The circular polarizing filter according to any one of [1] to [5], in which a liquid crystal compound forming the cholesteric liquid crystalline phase is horizontally aligned on at least one surface side of the reflected light-scattering circularly-polarized light separating layer.

[7] The circular polarizing filter according to any one of [1] to [6], in which the reflected light-scattering circularly-polarized light separating layer is a layer made from a composition containing a liquid crystal compound applied to a film surface not subjected to a rubbing treatment and an air interface alignment agent.

[8] The circular polarizing filter according to any one of [1] to [7], in which the circularly-polarized light separating layer includes a reflected light-non-scattering circularly-polarized light separating layer, and the reflected light-non-scattering circularly-polarized light separating layer is a layer which selectively transmits circularly polarized light of any one sense of either right-handed circularly polarized light or left-handed circularly polarized light at the specific wavelength, and selectively reflects circularly polarized light of the other sense, the reflected light-scattering circular polarization separation layer and the reflected light-non-scattering circularly-polarized light separating layer are the same as each other in terms of the sense of circularly polarized light to be selectively transmitted, and in the reflected light-non-scattering circularly-polarized light separating layer, scattering transmittance/vertical transmittance of circularly polarized light of such a sense as to be selectively transmitted at the specific wavelength is 0.00 to 0.05, and scattering reflectance/regular reflectance of circularly polarized light of the other sense at the specific wavelength is 0.00 to 0.05.

[9] The circular polarizing filter according to [8], in which in the reflected light-scattering circularly-polarized light separating layer, a haze value measured using natural light of the specific wavelength is greater than 10 to 55, and in the reflected light-non-scattering circularly-polarized light separating layer, a haze value measured using natural light of the specific wavelength is 1.0 or less.

[10] The circular polarizing filter according to [8] or [9], in which the reflected light-non-scattering circularly-polarized light separating layer is composed of a layer having a cholesteric liquid crystalline phase fixed therein.

[11] The circular polarizing filter according to [8] or [9], in which the reflected light-non-scattering circularly-polarized light separating layer is composed of a laminate of a linearly-polarized light separating layer and a layer functioning as a λ/4 phase difference layer at the specific wavelength.

[12] The circular polarizing filter according to any one of [1] to [11], in which the specific wavelength is within a range of 800 nm to 1500 nm.

[13] The circular polarizing filter according to any one of [1] to [12], further including a light blocking layer which blocks light in at least a part of a wavelength region not including the specific wavelength.

[14] The circular polarizing filter according to [12], further including a light blocking layer which blocks light in a wavelength region with a width of 50 nm or greater of 380 nm to 780 nm.

[15] A light source device including the circular polarizing filter according to any one of [1] to [14], and a light source capable of applying light of the specific wavelength.

[16] A sensor including the circular polarizing filter according to any one of [1] to [14], and a light receiving element capable of detecting light of the specific wavelength.

[17] A sensor system including the circular polarizing filter according to any one of [1] to [14], a light source capable of applying light of the specific wavelength, and a light receiving element capable of detecting light of the specific wavelength.

[18] A light source device including the circular polarizing filter according to any one of [8] to [10], and a light source capable of applying light of the specific wavelength, in which the light source, the reflected light-non-scattering circularly-polarized light separating layer, and the reflected light-scattering circularly-polarized light separating layer are arranged in this order.

[19] A sensor including the circular polarizing filter according to any one of [8] to [10], and a light receiving element capable of detecting light of the specific wavelength, in which the light receiving element, the reflected light-non-scattering circularly-polarized light separating layer, and the reflected light-scattering circularly-polarized light separating layer are arranged in this order.

[20] A sensor system including the circular polarizing filter according to any one of [8] to [10], a light source capable of applying light of a wavelength within the specific wavelength region, and a light receiving element capable of detecting light of a wavelength within the specific wavelength region, in which the light source, the reflected light-non-scattering circularly-polarized light separating layer, and the reflected light-scattering circularly-polarized light separating layer are arranged in this order, and the light receiving element, the reflected light-non-scattering circularly-polarized light separating layer, and the reflected light-scattering circularly-polarized light separating layer are arranged in this order.

[21] A method of manufacturing a circular polarizing filter for selectively transmitting circularly polarized light of any one sense of either right-handed circularly polarized light or left-handed circularly polarized light at a specific wavelength, the filter including a circularly-polarized light separating layer which selectively transmits circularly polarized light of any one sense of either right-handed circularly polarized light or left-handed circularly polarized light, and selectively reflects circularly polarized light of the other sense at the specific wavelength, the circularly-polarized light separating layer including a reflected light-scattering circularly-polarized light separating layer, and the reflected light-scattering circularly-polarized light separating layer being composed of a layer having a cholesteric liquid crystalline phase fixed therein, the method including adjusting alignment defects of the cholesteric liquid crystalline phase in the reflected light-scattering circularly-polarized light separating layer, such that scattering transmittance/vertical transmittance when circularly polarized light of the sense of the specific wavelength enters from any one surface is made to be less than scattering reflectance/regular reflectance when circularly polarized light of the other sense enters from the surface in the reflected light-scattering circularly-polarized light separating layer.

The invention provides a circular polarizing filter capable of providing circularly polarized light with a high circular polarizance, and a circular polarizing filter allowing an improvement in sensitivity in a sensor system using circularly polarized light. The circular polarizing filter of the invention can be applied to plant cultivation or can be applied as a constituent member of a circularly polarized light source device, a sensor, a sensor system, and the like.

DESCRIPTION OF THE PREFERRED EMBODIMENTS

Figure 1:
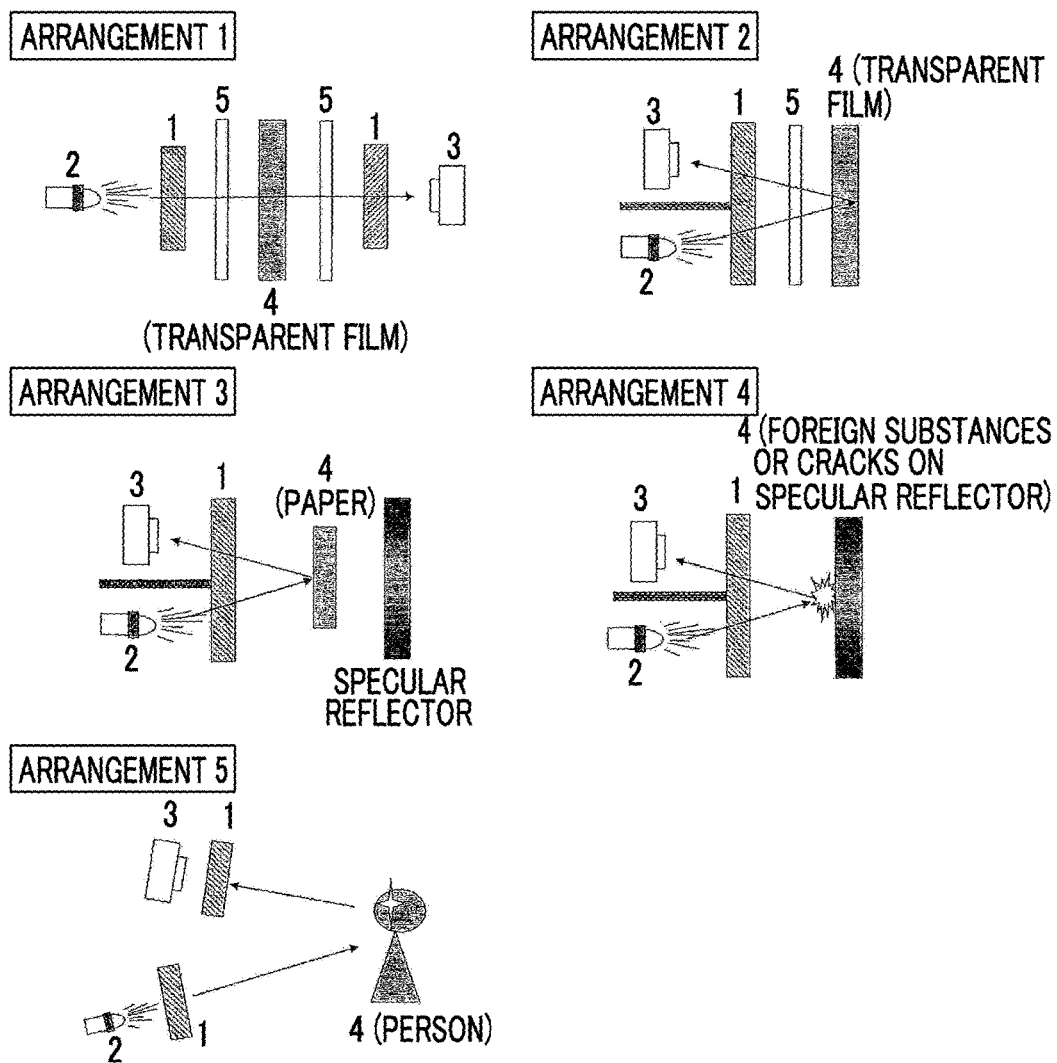
FIG. 1 is a diagram showing examples of the arrangement of an object to be detected, a light source, a light receiving element, and a circular polarizing filter as examples of the usage of a circular polarizing filter in a sensor system.

Hereinafter, the invention will be described in detail.

In this description, "to" is used in such a meaning that the numerical values described before and after "to" are included as a lower limit value and an upper limit value.

In this description, the angle (for example, an angle of "90°") and its relationship (for example, "perpendicular", "horizontal", and the like) include a range of error that is acceptable in the technical field to which the invention belongs. For example, the above expression means that the angle is within a range of the exact angle± less than 10°, and the range of error from the exact angle is preferably 5° or less, and more preferably 3° or less.

In this description, regarding circularly polarized light, the expression "selectively" is used in such a meaning that the light intensity of one of a right-handed circularly polarized light component and a left-handed circularly polarized light component is greater than that of the other circularly polarized light component. Specifically, when the expression "selectively" is used, the circular polarizance of light is preferably 0.3 or greater, more preferably 0.6 or greater, and even more preferably 0.8 or greater. Substantially, the circular polarizance of light is still more preferably 1.0.

Here, the circular polarizance is a value expressed by $||I_R-I_L|/(I_R+I_L)$ where $I_R$ denotes the intensity of a right-handed circularly polarized light component and $I_L$ denotes the intensity of a left-handed circularly polarized light component. In this description, the circular polarizance may be used to indicate a ratio of circularly polarized light components of light.

In this description, regarding circularly polarized light, the expression "sense" is used to mean either right-handed circularly polarized light or left-handed circularly polarized light. The sense of circularly polarized light is defined such that when light is viewed as it proceeds toward an observer, in the case in which a tip of an electric field vector rotates clockwise with an increase in time, the sense is right-handed circularly polarized light, and in the case in which it rotates counterclockwise, the sense is left-handed circularly polarized light.

In this description, the expression "sense" may also be used regarding the twisting direction of a helix of a cholesteric liquid crystal. As for the selective reflection by the cholesteric liquid crystal, when the twisting direction (sense) of the helix of the cholesteric liquid crystal is right-handed, right-handed circularly polarized light is reflected and left-handed circularly polarized light is transmitted, and when the sense is left-handed, left-handed circularly polarized light is reflected and right-handed circularly polarized light is transmitted.

In this description, the measurement of light intensity which is needed in relation to the calculation of light transmittance may be performed using, for example, a usual ultraviolet, visible, or near infrared spectrometer with the air as a reference.

In this description, the "reflected light" or "transmitted light" is simply mentioned, its meaning includes scattered light and diffracted light.

The polarization state at each wavelength of light can be measured using a spectral radiance meter or a spectrometer having a circular polarization plate mounted thereon. In this case, the intensity of light measured through a right-handed circular polarization plate corresponds to $I_R$, and the intensity of light measured through a left-handed circular polarization plate corresponds to $I_L$. Furthermore, usual light sources such as incandescent light bulbs, mercury lamps, fluorescent lamps, and LEDs emit approximately natural light, and characteristics of producing polarized light of a circular polarizing filter or a circularly-polarized light separating layer mounted thereon can be measured using, for example, a polarized light phase difference-analyzing apparatus "AxoScan" manufactured by Axometrics, Inc.

In addition, the measurement can also be performed by attaching a circular polarizing filter to an illuminometer or an optical spectrometer. The ratio can be measured by attaching a right-handed circularly polarized light transmissive plate and measuring a right-handed circularly polarized light intensity and by attaching a left-handed circularly polarized light transmissive plate and measuring a left-handed circularly polarized light intensity.

In this description, regarding an object having a film form such as a layer or a filter, the expression "surface" is used to mean any of two surfaces showing a film area, and does not indicate a surface in a thickness direction unless particularly mentioned. Usually, the "surface" intersects with a light incident direction at an angle closer to 90° in usage of the circular polarizing filter.

(Optical Properties of Circular Polarizing Filter)

The circular polarizing filter is a filter which selectively transmits either right-handed circularly polarized light or left-handed circularly polarized light at a specific wavelength. In this description, the light wavelength region which includes the specific wavelength and in which the circular polarizing filter or the circularly-polarized light separating layer selectively transmits either right-handed circularly polarized light or left-handed circularly polarized light may be referred to as "controlled wavelength region". The circular polarizing filter may selectively transmit either right-handed circularly polarized light or left-handed circularly polarized light with respect to light in a specific wavelength region entering from any surface. Otherwise, the circular polarizing filter may selectively transmit either right-handed circularly polarized light or left-handed circularly polarized light only with respect to light in a specific wavelength region entering from any one surface and may not exhibit the same selective transmission with respect to light entering from other surfaces.

The circular polarizing filter includes a circularly-polarized light separating layer. The circular polarizing filter selectively reflects either right-handed circularly polarized light or left-handed circularly polarized light at the specific wavelength based on the properties of the circularly-polarized light separating layer to be described later. At this time, the sense of the reflected circularly polarized light is different from that of the transmitted circularly polarized light. That is, the sense of the reflected circularly polarized light is left-handed when the sense of the transmitted circularly polarized light is right-handed, and the sense of the reflected circularly polarized light is right-handed when the sense of the transmitted circularly polarized light is left-handed.

In the circular polarizing filter of the invention, scattering transmittance/vertical transmittance when circularly polarized light of such a sense as to be selectively transmitted at the specific wavelength enters from any one surface is less than scattering reflectance/regular reflectance when circularly polarized light of the other sense enters from the same surface. In short, in the circular polarizing filter of the invention, the scattering properties of circularly polarized light transmitted from at least one surface are lower than the scattering properties of reflected circularly polarized light. During the course of studies on the above-described light-scattering cholesteric liquid crystal layer, the inventors of the invention have found that with a configuration satisfying such optical characteristics, the circular polarizance of the circularly polarized light obtained by the circular polarizing filter rises. Judging from the result, a possibility that the circular polarizance may be lowered because circularly polarized light of the opposite sense is emitted due to the interface reflection at an interface between the filter and the air is considered, and the influence of the interface reflection may be reduced by the configuration in which the scattering transmittance/vertical transmittance is less than the scattering reflectance/regular reflectance.

In this description, regarding the scattering transmittance/vertical transmittance or the scattering reflectance/regular reflectance, when the expression "is greater than" or "is less than" is used, the difference between the values is a significant difference, and does not include a difference of a range of error based on restrictions on the measurement method. A person skilled in the art can determine whether the difference is significant or not based on this whole description and common technical knowledge. Therefore, although the difference is not limited by a specific value, it is usually 0.50 or greater, and preferably 0.90 or greater.

In the circular polarizing filter of the invention, the scattering transmittance/vertical transmittance may be 0.00 to 0.10, and is preferably 0.00 to 0.05. Due to such a value, it is possible to secure a high light intensity and a high circular polarizance in a specific optical path, which are suitable for a case in which the circular polarizing filter is used in a sensor or the like. In addition, the scattering reflectance/regular reflectance may be 2.0 to 7.5, and is preferably 3.0 to 5.5. When the scattering reflectance/regular reflectance is greater than 7.5, the degree of transparency of the circularly-polarized light separating layer may be reduced.

The relationship between the scattering reflectance/regular reflectance and the scattering transmittance/vertical transmittance may be satisfied as a value obtained when circularly polarized light is made incident only from any one surface of the circular polarizing filter, and may be satisfied also when being measured with circularly polarized light made incident from any surface.

Each of the scattering transmittance/vertical transmittance and the scattering reflectance/regular reflectance is a value calculated based on a value measured using a spectrophotometer and an integrating sphere unit, as will be shown in examples to be described later. The vertical transmittance and the regular reflectance can be measured by the spectrophotometer, and the transmittance and the reflectance measured over the whole angle can be measured by a combination of the spectrophotometer and the integrating sphere unit. The vertical transmittance is a value measured at an incidence angle of 0°, and the regular reflectance may be, for example, a value measured at an incidence angle of 5° for the convenience of the measurement. The scattering transmittance can be calculated by subtracting the vertical transmittance from the transmittance measured over the whole angle. The scattering reflectance can be calculated by subtracting the regular reflectance from the reflectance measured over the whole angle. In order to measure the vertical transmittance, the regular reflectance, and the transmittance and reflectance measured over the whole angle of circularly polarized light of any one sense, a filter functioning as the circular polarizing filter at a measurement wavelength may be installed on the light source side.

The specific wavelength is not particularly limited. For example, it may be within a wavelength region of infrared rays, a wavelength region of visible light rays, or a wavelength region of ultraviolet rays. Infrared rays (infrared light) are electromagnetic waves in a wavelength region which is longer than that of visible light rays and shorter than that of radio waves. Near infrared light is generally an electromagnetic wave in a wavelength region of 700 nm to 2500 nm. Visible light rays are light rays having such a wavelength that these are seen by the human eye among electromagnetic waves, and indicate light in a wavelength region of 380 nm to 780 nm. Ultraviolet rays are electromagnetic waves in a wavelength region which is shorter than that of visible light rays and longer than that of X-rays. Ultraviolet rays may be light rays in a wavelength region which is distinguished from those of visible light rays and X-rays, and are, for example, light rays having a wavelength within a range of 10 nm to 420 nm.

The specific wavelength may be appropriately selected according to uses of the circular polarizing filter. For example, in the case of use in a sensor system, the specific wavelength may be a wavelength corresponding to a wavelength of near infrared light which is used in infrared cameras, infrared photoelectric sensors, infrared communication, or the like. In the case of use in plant cultivation, the specific wavelength may be a wavelength desirable for a light source or sunlight to be used.

The controlled wavelength region may be within a wavelength region of infrared rays, a wavelength region of visible light rays, or a wavelength region of ultraviolet rays, or may be a wavelength region extending across wavelength regions of infrared rays and visible light rays, wavelength regions of visible light rays and ultraviolet rays, or wavelength regions of infrared rays, visible light rays, and ultraviolet rays. The width of the controlled wavelength region is not particularly limited. For example, it may be a width including any one or more of wavelength regions of infrared rays, visible light rays, and ultraviolet rays, or be a wavelength width of 1 nm, 10 nm, 50 nm, 100 nm, 150 nm, or 200 nm. The width is preferably about 50 nm or greater.

In the circular polarizing filter, in the controlled wavelength region, the light transmittance {(light intensity of transmitted circularly polarized light)/(light intensity of incident circularly polarized light)×100} of circularly polarized light of the same sense as incident light when either right-handed circularly polarized light or left-handed circularly polarized light is allowed to enter may be 70% or greater, 80% or greater, 90% or greater, 95% or greater, or 99% or greater, and preferably and substantially 100%. Simultaneously, in the same wavelength region, the light transmittance {(light intensity of transmitted circularly polarized light)/(light intensity of incident circularly polarized light)×100} of circularly polarized light of the same sense as incident light when circularly polarized light of the other sense is allowed to enter may be 30% or less, 20% or less, 10% or less, 5% or less, 1% or less, and preferably and substantially 0%.

Optical characteristics of the circular polarizing filter with respect to light in a wavelength region other than the controlled wavelength region are not particularly limited, and preferred characteristics may be imparted according to uses. For example, when the circular polarizing filter is used in a sensor system, the circular polarizing filter preferably has low light transmittance in at least a part of a wavelength region other than the controlled wavelength region in some cases. The reason for this is because the light (light disturbing sensing) which reaches a light receiving element but is not required in sensing can be greatly reduced, a ratio of S to N can be increased, and thus the minimum light intensity which is detected by the light receiving element can be lowered. At this time, particularly in a wavelength region of the light which is not required in sensing, the average light transmittance may be 50% or less, 40% or less, 30% or less, 20% or less, 10% or less, or 5% or less.

It is preferable that in the circular polarizing filter, the change in the refractive index is small in the normal direction and in a direction obliquely passing in the thickness direction of the circular polarizing filter, and thus the traveling direction of the light does not change.

Hereinafter, the respective layers of the circular polarizing filter will be described.

(Circularly-Polarized Light Separating Layer)

The circularly-polarized light separating layer has a function of selectively transmitting either right-handed circularly polarized light or left-handed circularly polarized light at a specific wavelength. In addition, the circularly-polarized light separating layer can separate light (natural light, unpolarized light) at a specific wavelength entering from one surface into right-handed circularly polarized light and left-handed circularly polarized light, and can selectively transmit any one of them to the other surface side.

The specific wavelength at which the circularly-polarized light separating layer selectively transmits either right-handed circularly polarized light or left-handed circularly polarized light, or the width of the controlled wavelength region may be the same as those in the description of the circular polarizing filter. The specific wavelength at which the circularly-polarized light separating layer selectively transmits either right-handed circularly polarized light or left-handed circularly polarized light may be a wavelength of light necessary according to the form of use of the circular polarizing filter. The wavelength region in which the circularly-polarized light separating layer selectively transmits either right-handed circularly polarized light or left-handed circularly polarized light may include a wavelength region of light necessary according to the form of use of the circular polarizing filter.

The circularly-polarized light separating layer may transmit, reflect, or absorb light in a wavelength region other than the wavelength region in which the circularly-polarized light separating layer selectively transmits either right-handed circularly polarized light or left-handed circularly polarized light.

(Reflected Light-Scattering Circularly-Polarized Light Separating Layer)

The circularly-polarized light separating layer in the circular polarizing filter of the invention includes a reflected light-scattering circularly-polarized light separating layer in which the scattering transmittance/vertical transmittance of circularly polarized light of such a sense as to be selectively transmitted at a specific wavelength is less than the scattering reflectance/regular reflectance of circularly polarized light of the other sense. The reflected light-scattering circularly-polarized light separating layer is a layer which selectively transmits circularly polarized light of any one sense of either right-handed circularly polarized light or left-handed circularly polarized light at the specific wavelength. The reflected light-scattering circularly-polarized light separating layer is composed of a layer having a cholesteric liquid crystalline phase fixed therein, and the specific wavelength can be adjusted by adjusting a central wavelength of the circularly polarized light-selective reflection of the layer having a cholesteric liquid crystalline phase fixed therein as will be described later. Both of the scattering transmittance/vertical transmittance and the scattering reflectance/regular reflectance are values at the specific wavelength. The reflected light-scattering circularly-polarized light separating layer has high scattering properties with respect to reflected light and transmitted light of circularly polarized light of a specific wavelength (selective reflection wavelength) of one sense. In contrast, the reflected light-scattering circularly-polarized light separating layer has low scattering properties with respect to circularly polarized light of the opposite sense. That is, for example, when the reflected light-scattering circularly-polarized light separating layer is formed of a right-handed helical cholesteric liquid crystal, the scattering properties of reflected circularly polarized light and transmitted circularly polarized light of right-handed circularly polarized light of the selective reflection wavelength may be high, but the scattering properties of left-handed circularly polarized light may be low. When the reflected light-scattering circularly-polarized light separating layer is formed of a left-handed helical cholesteric liquid crystal, the scattering properties of reflected circularly polarized light and transmitted circularly polarized light of left-handed circularly polarized light of the selective reflection wavelength may be high, but the scattering properties of right-handed circularly polarized light may be low.

In the reflected light-scattering circularly-polarized light separating layer, the scattering transmittance/vertical transmittance of circularly polarized light of such a sense as to be selectively transmitted at the specific wavelength may be 0.00 to 0.10, and is preferably 0.00 to 0.05. Due to such a value, it is possible to secure a high light intensity and a high circular polarizance in a specific optical path, which are suitable for a case in which the circular polarizing filter is used in a sensor or the like. In addition, in the circularly-polarized light separating layer, the scattering reflectance/regular reflectance of circularly polarized light of a sense opposite to the sense of the selective transmission at the specific wavelength may be 2.0 to 7.5, and is preferably 3.0 to 5.0. When the scattering reflectance/regular reflectance is 7.5 or less, the degree of transparency of the circularly-polarized light separating layer can be prevented from being reduced.

In the reflected light-scattering circularly-polarized light separating layer, a haze value measured using natural light of the specific wavelength is preferably greater than 10 to 55, and more preferably greater than 20 to 50. In this description, the haze value is {(scattering transmittance of natural light)/(scattering transmittance of natural light+vertical transmittance of natural light)×100(%)}. The haze value can be calculated based on a value measured using a spectrophotometer and an integrating sphere unit as in the description of the measurement of the scattering transmittance/vertical transmittance of circularly polarized light. In the measurement, the measurement may be performing without using a filter functioning as the circular polarizing filter on the light source side.

The thickness of the reflected light-scattering circularly-polarized light separating layer is not particularly limited as long as it is within a range in which the above-described characteristics are shown. The thickness is preferably 0.8 µm or greater, 1 µm or greater, or 4.0 µm or greater, and within a range of 100 µm or less, within a range of 10 µm or less, or within a range of 5 µm or less. When the thickness is 0.8 µm or greater, the selective reflection based on the periodic structure can be sufficiently conducted such that the polarizance of transmitted light is not reduced. In addition, when the thickness is 10 µm or less, the polarizance can be maintained.

(Reflected Light-Non-Scattering Circularly-Polarized Light Separating Layer)

The circularly-polarized light separating layer may be composed of only a reflected light-scattering circularly-polarized light separating layer, or may be composed of a reflected light-scattering circularly-polarized light separating layer and a reflected light-non-scattering circularly-polarized light separating layer which does not have the above-described reflected light scattering properties. The outermost surface of the circularly-polarized light separating layer composed of a reflected light-scattering circularly-polarized light separating layer and a reflected light-non-scattering circularly-polarized light separating layer preferably includes at least a reflected light-scattering circularly-polarized light separating layer.

The reflected light-non-scattering circularly-polarized light separating layer is a layer which selectively transmits circularly polarized light of any one sense of either right-handed circularly polarized light or left-handed circularly polarized light at the specific wavelength. The reflected light-non-scattering circularly-polarized light separating layer may be the same as the reflected light-scattering circularly-polarized light separating layer in terms of the sense of circularly polarized light to be selectively transmitted. In the reflected light-non-scattering circularly-polarized light separating layer, the scattering transmittance/vertical transmittance of circularly polarized light of such a sense as to be selectively transmitted at the specific wavelength may be 0.00 to 0.05, and is preferably 0.00 to 0.03, and the scattering reflectance/regular reflectance of circularly polarized light of the other sense may be 0.00 to 0.05, and is preferably 0.00 to 0.03. In the reflected light-non-scattering circularly-polarized light separating layer, the scattering properties of reflected light and transmitted light of circularly polarized light of a specific wavelength (selective reflection wavelength) of one sense are substantially the same as the scattering properties of circularly polarized light of the opposite sense. The haze value of the reflected light-non-scattering circularly-polarized light separating layer, measured using natural light of the specific wavelength, is 3.0 or less, and preferably 1.0 or less.

The thickness of the reflected light-non-scattering circularly-polarized light separating layer is preferably within a range of 1.0 µm to 200 µm, and more preferably within a range of 4.0 µm to 150 µm.

The total of the thicknesses of the reflected light-scattering circularly-polarized light separating layer and the reflected light-non-scattering circularly-polarized light separating layer is preferably within a range of 2.0 µm to 300 µm, and more preferably within a range of 8.0 µm to 220 µm. When the total of the thicknesses is 2.0 µm or greater, the selective reflection (selective transmission) based on the periodic structure can be sufficiently secured. In addition, when the total of the thicknesses is 300 µm or less, the scattering of circularly polarized light of such a sense as not to be scattered increases, and thus the circular polarizance can be prevented from being reduced.

As the reflected light-non-scattering circularly-polarized light separating layer, a layer having a cholesteric liquid crystalline phase fixed therein, or a laminate including a linearly-polarized light separating layer and a $\lambda/4$ phase difference layer may be used.

(Layer Having Cholesteric Liquid Crystalline Phase Fixed Therein)

The cholesteric liquid crystalline phase is known to exhibit circularly polarized light-selective reflection in which circularly polarized light of any one sense of either right-handed circularly polarized light or left-handed circularly polarized light is selectively reflected and circularly polarized light of the other sense is transmitted. Usually, the cholesteric liquid crystalline phase also exhibits the above-described circularly polarized light-selective reflection with respect to light entering from any surface.

As the film exhibiting the circularly polarized light-selective reflection properties, many films made from a composition containing a polymerizable liquid crystal compound have been known, and the prior art thereof can be referred to with respect to the layer having a cholesteric liquid crystalline phase fixed therein.

The layer having a cholesteric liquid crystalline phase fixed therein may be a layer in which the alignment of a liquid crystal compound having a cholesteric liquid crystalline phase is maintained. Typically, a polymerizable liquid crystal compound may be allowed to have an alignment state of the cholesteric liquid crystalline phase, and then polymerized and cured by ultraviolet irradiation, heating, or the like to form a layer having no fluidity, and the layer may be a layer changed to have such a state that the alignment form is not changed by an external field or external force. In the layer having a cholesteric liquid crystalline phase fixed therein, it is only necessary to maintain the optical properties of the cholesteric liquid crystalline phase in the layer, and the liquid crystalline compound in the layer may not exhibit liquid crystallinity. For example, the polymerizable liquid crystal compound may lose liquid crystallinity due to an increase in the molecular weight due to a hardening reaction.

In this description, the layer having a cholesteric liquid crystalline phase fixed therein may be referred to as a cholesteric liquid crystal layer or a liquid crystal layer.

The layer having a cholesteric liquid crystalline phase fixed therein exhibits circularly polarized light-selective reflection derived from the helical structure of the cholesteric liquid crystal. A central wavelength $\lambda$ of the reflection depends on a pitch length P (period of helix) of the helical structure of the cholesteric phase, and satisfies the relationship of λ=n×p with an average refractive index n of the cholesteric liquid crystal layer. Thus, by adjusting the pitch length of the helical structure, the wavelength at which the circularly polarized light-selective reflection is exhibited can be adjusted. That is, by adjusting the n value and the P value, the central wavelength λ can be adjusted to be within a wavelength region of 780 nm to 2000 nm, and preferably 800 nm to 1500 nm in order to selectively transmit (reflect) either right-handed circularly polarized light or left-handed circularly polarized light in at least a part of the wavelength region of near infrared light, the central wavelength λ can be adjusted to be within a wavelength region of 380 nm to 780 nm in order to selectively transmit (reflect) either right-handed circularly polarized light or left-handed circularly polarized light in at least a part of the wavelength region of visible light, and the central wavelength λ can be adjusted to be within a wavelength region of 10 nm to 420 nm, and preferably 200 nm to 410 nm in order to selectively transmit (reflect) either right-handed circularly polarized light or left-handed circularly polarized light in at least a part of the wavelength region of ultraviolet light. The pitch length of the cholesteric liquid crystalline phase depends on the type of a chiral agent which is used with the polymerizable liquid crystal compound or the concentration of the chiral agent added. Accordingly, by adjusting these, a desired pitch length can be obtained. As a method of measuring helical sense or pitch, the methods described in "Introduction to Experimental Liquid Crystal Chemistry", edited by The Japanese Liquid Crystal Society, published in 2007 by Sigma Publishing Co., Ltd., p. 46, and "Liquid Crystal Handbook", the Editing Committee of Liquid Crystal Handbook, Maruzen Publishing Co., Ltd., p. 196 can be used.

The sense of circularly polarized light reflected from the cholesteric liquid crystal layer matches the helical sense. Therefore, a cholesteric liquid crystal layer in which the helical sense is either right-handed or left-handed may be used as the circularly-polarized light separating layer. The circularly-polarized light separating layer may be a laminate of two or more layers each having a cholesteric liquid crystalline phase fixed therein, but upon lamination, a plurality of cholesteric liquid crystal layers of the same helical sense with the same period P may be laminated. By laminating cholesteric liquid crystal layers of the same helical sense with the same period P, circular polarizing selectivity can be increased at a specific wavelength. Upon lamination, a cholesteric liquid crystal layer produced separately may be laminated using an adhesive or the like, but a process including: direct application of a liquid crystal composition containing a polymerizable liquid crystal compound and the like to a surface of the cholesteric liquid crystal layer formed through a method to be described later; alignment; and fixing is preferably repeated. By virtue of such a process, the alignment direction of liquid crystal molecules on the air interface side of the cholesteric liquid crystal layer formed in advance matches the alignment direction of liquid crystal molecules on the lower side of the cholesteric liquid crystal layer formed thereon, and the circularly-polarized light separating layer has good polarization characteristics.

A half band width Δλ (nm) of a selective reflection band (circularly polarized light reflection band) in which circularly polarized light-selective reflection is exhibited depends on birefringence Δn of the liquid crystal compound and the pitch length P, and satisfies the relationship of Δλ=Δn×P. Consequently, a width of the selective reflection band can be controlled by adjusting Δn. Δn can be adjusted by adjusting the type of the polymerizable liquid crystal compound or the mixing ratio thereof, or by controlling the temperature at the time of alignment fixing.

The width of the circularly polarized light reflection band (since the spectral profile of the circularly polarized light reflection of the cholesteric liquid crystal layer has a square shape, in general, the "width" is substantially the same as "half band width Δλ") is generally about 50 nm to 150 nm in a visible light region in one type of material. In order to widen the controlled wavelength region, two or more types of cholesteric liquid crystal layer with different periods P, which are different in the central wavelength of reflected light, may be laminated. In this case also, cholesteric liquid crystal layers of the same helical sense are preferably laminated.

In addition, in one cholesteric liquid crystal layer, the controlled wavelength region can also be widened by gradually changing the period P in the film thickness direction.

(Method of Producing Layer Having Cholesteric Liquid Crystalline Phase Fixed Therein)

Hereinafter, a material and a method for producing the cholesteric liquid crystal layer which can be used in the circularly-polarized light separating layer and in a light reflection layer to be described later will be described.

As a material which is used to form the cholesteric liquid crystal layer, a liquid crystal composition or the like containing a polymerizable liquid crystal compound and a chiral agent (optically active compound) can be exemplified. The liquid crystal composition further mixed with a surfactant, a polymerization initiator, or the like if necessary and dissolved in a solvent or the like is applied to a base (support, alignment film, cholesteric liquid crystal layer serving as underlying layer, or the like), and after cholesteric alignment and maturing, fixing is performed, and thus the cholesteric liquid crystal layer can be formed.

Polymerizable Liquid Crystal Compound

The polymerizable liquid crystal compound may be either a rod-shaped liquid crystal compound or a discotic liquid crystal compound, but a rod-shaped liquid crystal compound is preferred.

Examples of the rod-shaped polymerizable liquid crystal compound which forms the cholesteric liquid crystal layer include a rod-shaped nematic liquid crystal compound. As the rod-shaped nematic liquid crystal compound, azomethines, azoxys, cyanobiphenyls, cyanophenyl esters, benzoate esters, phenyl cyclohexanecarboxylate esters, cyanophenylcyclohexanes, cyano-substituted phenylpyrimidines, alkoxy-substituted phenylpyrimidines, phenyldioxanes, tolanes, and alkenylcyclohexylbenzonitriles are preferably used. Not only low molecular liquid crystal compounds, but also high molecular liquid crystal compounds are usable here.

The polymerizable liquid crystal compound is obtained by introducing a polymerizable group into a liquid crystal compound. Examples of the polymerizable group include an unsaturated polymerizable group, an epoxy group, and an aziridinyl group. An unsaturated polymerizable group is preferred, and an ethylenic unsaturated polymerizable group is more preferred. The polymerizable group can be introduced into the molecule of the liquid crystal compound by various methods. The number of the polymerizable groups of the polymerizable liquid crystal compound is preferably 1 to 6, and more preferably 1 to 3. Examples of the polymerizable liquid crystal compound include the compounds described in Makromol. Chem., Vol. 190, p. 2255 (1989), Advanced Materials, Vol. 5, p. 107 (1993), U.S. Pat. No. 4,683,327A, U.S. Pat. No. 5,622,648A, and U.S. Pat.

No. 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more types of polymerizable liquid crystal compound may be used in combination. When two or more types of polymerizable liquid crystal compound are used in combination, the alignment temperature can be reduced.

The amount of the polymerizable liquid crystal compound added in the liquid crystal composition is preferably 80 mass % to 99.9 mass %, more preferably 85 mass % to 99.5 mass %, and even more preferably 90 mass % to 99 mass % with respect to the mass of the solid content (mass excluding mass of solvent) of the liquid crystal composition.

Chiral Agent (Optically Active Compound)

The chiral agent has a function of inducing the helical structure of the cholesteric liquid crystalline phase. A chiral compound may be selected according to the purpose since the sense of the helix or the pitch of the helix to be induced differs depending on the compound.

The chiral agent is not particularly limited, and a known compound (for example, those described in Liquid Crystal Device Handbook, Chap. 3, Section 4-3, Chiral Agent for TN, STN, p. 199, edited by Japan Society for the Promotion of Science, No. 142 Committee, 1989), isosorbide, or an isomannide derivative can be used.

The chiral agent generally contains an asymmetric carbon atom, but an axially asymmetric compound or a planarly asymmetric compound which does not contain an asymmetric carbon atom can also be used as the chiral agent. Examples of the axially asymmetric compound or planarly asymmetric compound include binaphthyl, helicene, paracyclophane, and derivatives thereof. The chiral agent may have a polymerizable group. When both of the chiral agent and the liquid crystal compound have a polymerizable group, a polymer having a repeating unit induced from the polymerizable liquid crystal compound and a repeating unit induced from the chiral agent can be formed by a polymerization reaction of the polymerizable chiral agent and the polymerizable liquid crystal compound. In this aspect, the polymerizable group of the polymerizable chiral agent is preferably the same kind of group as the polymerizable group of the polymerizable liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

The chiral agent may be a liquid crystal compound.

The chiral agent preferably has a photoisomerization group since a desired reflection wavelength pattern corresponding to an emission wavelength can be formed by application and alignment, followed by photomask irradiation with active rays or the like. As the photoisomerization group, an isomerization site of a compound exhibiting photochromic properties, an azo group, an azoxy group, and a cinnamoyl group are preferred. As a specific compound, a compound described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, or JP2003-313292A can be used.

The content of the chiral agent in the liquid crystal composition is preferably 0.01 mol % to 200 mol %, and more preferably 1 mol % to 30 mol % of the amount of the polymerizable liquid crystalline compound.

Polymerization Initiator

The liquid crystal composition preferably contains a polymerization initiator. In an aspect in which the polymerization reaction is allowed to proceed by ultraviolet irradiation, the polymerization initiator to be used is preferably a photopolymerization initiator capable of initiating a polymerization reaction by ultraviolet irradiation. Examples of the photopolymerization initiator include α-carbonyl compounds (described in U.S. Pat. No. 2,367,661A and U.S. Pat. No. 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. No. 3,046,127A and U.S. Pat. No. 2,951,758A), a combination of triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A).

The content of the photopolymerization initiator in the liquid crystal composition is preferably 0.1 mass % to 20 mass %, and more preferably 0.5 mass % to 5 mass % with respect to the content of the polymerizable liquid crystal compound.

Crosslinking Agent

The liquid crystal composition may arbitrarily contain a crosslinking agent to improve film strength and durability after curing. As the crosslinking agent, a crosslinking agent which is cured by ultraviolet rays, heat, humidity, or the like can be suitably used.

The crosslinking agent is not particularly limited, and can be appropriately selected according to the purpose. Examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group on a side chain; and alkoxysilane compounds such as vinyltrimethoxysilane and N-(2-aminoethyl)3-aminopropyltrimethoxysilane. Furthermore, a known catalyst can be used according to the reactivity of the crosslinking agent, and productivity can be improved along with the improvement in film strength and durability. These may be used alone or in combination of two or more kinds thereof.

The content of the crosslinking agent is preferably 3 mass % to 20 mass %, and more preferably 5 mass % to 15 mass %. When the content of the crosslinking agent is less than 3 mass %, the crosslinking density improving effect may not be obtained, and when the content is greater than 20% by mass, stability of the cholesteric liquid crystal layer may be reduced.

Alignment Control Agent

An alignment control agent which contributes to stably or rapidly forming a planar-aligned cholesteric liquid crystal layer may be added to the liquid crystal composition. Examples of the alignment control agent include fluoro (meth)acrylate polymers described in paragraphs [0018] to [0043] of JP2007-272185A and compounds expressed by Formulae (I) to (IV) described in paragraphs [0031] to [0034] of JP2012-203237A.

The alignment control agents may be used alone or in combination of two or more kinds thereof.

The amount of the alignment control agent added in the liquid crystal composition is preferably 0.01 mass % to 10 mass %, more preferably 0.01 mass % to 5 mass %, and particularly preferably 0.02 mass % to 1 mass % with respect to the total mass of the polymerizable liquid crystal compound.

Other Additives

The liquid crystal composition may contain at least one selected from various additives such as a surfactant for adjusting surface tension of the coating film and for uniformizing the film thickness and a polymerizable monomer. In the liquid crystal composition, if necessary, a polymerization inhibitor, an antioxidant, an ultraviolet absorber, a light stabilizer, a coloring material, fine metal oxide particles, and the like can be further added within such a range that the optical properties are not reduced.

A liquid crystal composition which is obtained by dissolving a polymerizable liquid crystal compound and a polymerization initiator, and if necessary, a chiral agent, a surfactant, and the like in a solvent is applied to a base and dried to obtain a coating film, the coating film is irradiated with active rays to polymerize the cholesteric liquid crystal composition, and thus a cholesteric liquid crystal layer in which cholesteric regularity is fixed can be formed. In addition, a laminate film consisting of a plurality of cholesteric liquid crystal layers can be formed by repeating the process of manufacturing a cholesteric liquid crystal layer.

The solvent used to prepare the liquid crystal composition is not particularly limited, and can be appropriately selected according to the purpose. An organic solvent is preferably used.

The organic solvent is not particularly limited, and can be appropriately selected according to the purpose. Examples thereof include ketones, alkyl halides, amides, sulfoxides, heterocyclic compounds, hydrocarbons, esters, and ethers. These may be used alone or in combination of two or more kinds thereof. Among these, when environmental load is taken into consideration, ketones are particularly preferred.

The method of applying the liquid crystal composition to the base is not particularly limited, and can be appropriately selected according to the purpose. Examples thereof include a wire bar coating method, a curtain coating method, an extrusion coating method, a direct gravure coating method, a reverse gravure coating method, a die coating method, a spin coating method, a dip coating method, a spray coating method, and a slide coating method. Furthermore, the application can also be performed by transferring the liquid crystal composition, which has been separately coated on a support, to the base. By heating the applied cholesteric liquid crystal composition, liquid crystal molecules are aligned. The heating temperature is preferably 200° C. or lower, and more preferably 130° C. or lower. Through this alignment treatment, an optical thin film in which the polymerizable liquid crystal compound is twist-aligned to have a helical axis in a direction substantially perpendicular to the film surface is obtained.

The aligned liquid crystal compound may be further polymerized. For the polymerization, any of thermal polymerization and photopolymerization by light irradiation may be performed, but photopolymerization is preferred. For the photopolymerization, ultraviolet rays are preferably used. The irradiation energy is preferably 20 mJ/cm$^2$ to 50 J/cm$^2$, and more preferably 100 mJ/cm$^2$ to 1500 mJ/cm$^2$. In order to accelerate the photopolymerization reaction, light irradiation may be performed during heating or under a nitrogen atmosphere. The wavelength of ultraviolet rays for irradiation is preferably 350 nm to 430 nm. From the viewpoint of stability, the higher the polymerization reaction rate, the better. The rate is preferably 70% or higher, and more preferably 80% or higher.

The polymerization reaction rate can be determined by measuring a proportion of the consumed polymerizable functional groups by using an IR absorption spectrum.

(Method of Forming Reflected Light-Scattering Circularly-Polarized Light Separating layer: Method of Adjusting Scattering Reflectance)

As a result of the study, the inventors of the invention have found that the optical characteristics of the reflected light-scattering circularly-polarized light separating layer can be obtained by allowing the structure of the cholesteric liquid crystal layer to be in a state in which a tilt angle of the liquid crystal is approximately horizontal in both surfaces of the film, and the liquid crystal has a random in-plane alignment direction. The structure of the cholesteric liquid crystal layer may be confirmed using a transmission electron microscope (TEM) image or the like of a cross-section of the layer. At this time, the helical axis of the cholesteric liquid crystal may be distributed with a slight undulation in the plane. The deviation from the normal line of the layer may be 0.1° to 10°, and is preferably 2° to 7.5°. That is, since a plurality of alignment defects exist in this layer, this layer becomes a scattering layer.

By adjusting the tilt angle and the in-plane alignment direction of the liquid crystal molecules of the cholesteric liquid crystal layer as described above, a configuration having an inclination of the helical axis of the cholesteric liquid crystalline phase in the outermost surface can be realized. By virtue of the configuration having an inclination of the helical axis of the cholesteric liquid crystalline phase in the outermost surface, it is thought that the helical axis of the cholesteric liquid crystalline phase can be distributed with a slight undulation in the plane as described above. That is, a deviation of the helical axis from the normal line direction of the layer can be generated. Due to this deviation of the helical axis, this layer becomes a scattering layer. In this layer, a plurality of alignment defects may exist.

The inclination of the helical axis of the outermost surface of the cholesteric liquid crystal layer can be obtained as follows.

Figure 5:
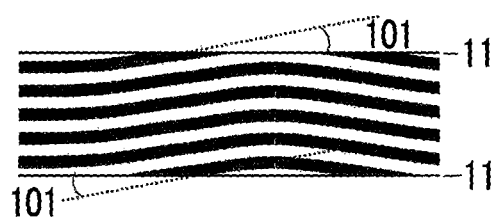
FIG. 5 is a schematic diagram showing a striped pattern of light portions and dark portions, observed by observing a cross-section of a cholesteric liquid crystal layer with a TEM.

When observing a cross-section of the cholesteric liquid crystal layer with a TEM, it is possible to observe a striped pattern of light portions and dark portions. The striped pattern is observed such that the light portions and the dark portions are repeated in a direction approximately parallel to the surface of the layer. FIG. 5 shows a schematic diagram. Two cycles of repetition of the light portions and the dark portions (two light portions and two dark portions) correspond to one pitch of the helix. The normal line direction of the striped pattern becomes the helical axis. The inclination of the helical axis of the outermost surface of the cholesteric liquid crystal layer can be obtained as an angle between a line formed by the first dark portion from an outermost surface 11 and the outermost surface on the same side (101 in FIG. 5).

When the cholesteric liquid crystal layer is configured such that the inclination of the helical axis of the outermost surface is changed in the plane, this layer may be a scattering layer having high scattering reflectance. The expression "inclination of the helical axis is changed" indicates a state in which when the inclination of the helical axis is measured at constant intervals on an arbitrary straight line of the surface, an increase and a reduction are confirmed in a straight-line traveling direction. The increase and the reduction are preferably repeated, and the change is preferably continuous.

The outermost surface may be at least one (top surface or bottom surface) or both sides (top surface and bottom surface) of the cholesteric liquid crystal layer, and is preferably both sides. The maximum value of the inclination of the helical axis may be 2° to 20°, and is preferably 5° to 20°.

The pretilt angle of the reflected light-scattering circularly-polarized light separating layer on the support side is preferably within a range of 0 degrees to 20 degrees, and more preferably within a range of 0 degrees to 10 degrees. When the pretilt angle increases, the density of alignment defects increases and the inclination angle distribution of the helical axis increases, whereby the polarizance of transmitted light is reduced. In addition, when the in-plane alignment direction of the liquid crystal on the support side is uniform, the scattering properties become insufficient, and the effect of improving the polarizance of transmitted light is reduced.

In the alignment of the cholesteric liquid crystal molecules in the formation of the reflected light-scattering circularly-polarized light separating layer, in order to align the liquid crystal molecules on the support side approximately horizontally (in parallel with the surface of the support), and in order to reduce the alignment uniformity of the liquid crystal molecules, it is preferable that an alignment treatment such as rubbing is not performed on the surface of the support or the alignment film to which a composition containing a cholesteric liquid crystal compound is applied. As the alignment film, an alignment film giving a small tilt angle with respect to the liquid crystal molecules can be preferably used. The above-described air interface alignment agent is preferably used to horizontally align the liquid crystal molecules on the air interface side.

In this description, the "tilt angle" means an angle formed between the inclined liquid crystal molecules and the planar surface of the layer, and means the largest angle among angles formed between a maximum refractive index direction and the planar surface of the layer in a refractive index ellipsoid of the liquid crystal compound. Accordingly, in the rod-shaped liquid crystal compound having positive optical anisotropy, the tilt angle means an angle formed between a longitudinal direction of the rod-shaped liquid crystal compound, that is, a director direction and the planar surface of the layer. The in-plane alignment direction of the liquid crystal molecules means a direction in a surface parallel to the layer in the maximum refractive index direction of the liquid crystal molecules. The random in-plane alignment direction means a state in which liquid crystal molecules, having an in-plane alignment direction which is different from an average in-plane alignment direction of the liquid crystal compound molecules in the plane by 4° or more, can be confirmed to be 10% to 20% by a TEM.

In addition, in this description, the liquid crystal molecules mean molecules of the polymerizable liquid crystal compound in the liquid crystal composition, and when the polymerizable liquid crystal compound is polymerized by a curing reaction of the liquid crystal composition, the liquid crystal molecules mean a partial structure corresponding to the polymerizable liquid crystal compound molecules.

In the alignment of the polymerizable liquid crystal compound in the formation of the cholesteric liquid crystal layer, the tilt angle of the liquid crystal molecules in the surface on the underlying layer side is preferably within a range of 0° to 20°, and more preferably 0° to 10°. By controlling the tilt angle to the above values, the density of alignment defects and the inclination angle distribution of the helical axis can be adjusted within preferred ranges, respectively.

In the alignment of the polymerizable liquid crystal compound in the formation of the cholesteric liquid crystal layer, in order to reduce the tilt angle (pretilt angle) of the liquid crystal molecules, and preferably to align the liquid crystal molecules horizontally in the surface on the underlying layer side as described above, and in order to reduce the alignment uniformity of the liquid crystal molecules, it is preferable that an alignment treatment such as rubbing is not performed on the surface of a transparent layer, a base, or another cholesteric liquid crystal layer to be described later to which the liquid crystal composition is applied. The above-described horizontal alignment agent is preferably used to horizontally align the liquid crystal molecules on the air interface side of the cholesteric liquid crystal layer.

(Laminate Including Linearly-Polarized Light Separating Layer and λ/4 Phase Difference Layer)

A laminate including a linearly-polarized light separating layer and a λ/4 phase difference layer may be used as the reflected light-non-scattering circularly-polarized light separating layer. In the circularly-polarized light separating layer formed of a laminate including a linearly-polarized light separating layer and a λ/4 phase difference layer, light entering from a surface of the linearly-polarized light separating layer is changed into linearly polarized light by reflection or absorption, and then changed into right- or left-handed circularly polarized light by passing through the λ/4 phase difference layer. In the case of light incidence from the λ/4 phase difference layer, light in any polarization state is changed into linearly polarized light by the linearly-polarized light separating layer through which the light passes finally, but particularly, when the incident light is circularly polarized light, the light is changed into linearly polarized light parallel or perpendicular to the transmission axis of the linearly-polarized light separating layer by the λ/4 phase difference layer. Accordingly, light is preferably allowed to enter from the side of the λ/4 phase difference layer in order to use it in discrimination of the sense of the incident circularly polarized light, and light is preferably allowed to enter from the side of the linearly-polarized light separating layer when using emitted circularly polarized light.

The linearly-polarized light separating layer and the λ/4 phase difference layer may be stuck to each other with an adhesive or the like, or may be directly brought into contact with each other.

(Linearly-Polarized Light Separating Layer)

A linear polarizer corresponding to the above-described controlled wavelength region may be used as the linearly-polarized light separating layer.

The linear polarizer includes a reflective linear polarizer and an absorbing linear polarizer.

Examples of the reflective linear polarizer include (i) a linearly polarized light reflection plate having a multi-layer structure, (ii) a polarizer including a laminate of thin films having different types of birefringence, (iii) a wire grid-type polarizer, (vi) a polarizing prism, and (v) a scattering anisotropic polarizing plate.

As (i) the linearly polarized light reflection plate having a multi-layer structure, a laminate of a plurality of dielectric thin films having different refractive indices can be exemplified. In order to form a wavelength-selective reflection film, it is preferable that a dielectric thin film having a high refractive index and a dielectric thin film having a low refractive index are alternately laminated in a plurality of layers. However, the number of film types is not limited to two, and three or more types of film may be used.

The number of the layers to be laminated is preferably 2 to 20, more preferably 2 to 12, even more preferably 4 to 10, and particularly preferably 6 to 8. When the number of the layers to be laminated is greater than 20, production efficiency may decrease due to multi-layer vapor deposition.

The order of laminating the dielectric thin films is not particularly limited, and can be appropriately selected according to the purpose. For example, when the refractive indices of the adjacent films are high, a film having a lower refractive index is laminated first. Inversely, when the refractive indices of the adjacent films are low, a film having a higher refractive index is laminated first. The refractive index is determined to be high or low based on a refractive index of 1.8. The criterion for determining whether a refractive index is high or low is not absolute. Among materials having a high refractive index, there may be materials having a relatively high refractive index and materials having a relatively low refractive index, and these may be alternately used.

Examples of the material of the dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, SiO, $Ta_2O_5$, $TiO_2$, TlCl, $Y_2O_3$, ZnSe, ZnS, and $ZrO_2$. Among these, $Bi_2O_3$, $CeO_2$, $CeF_3$, $HfO_2$, SiO, $Ta_2O_5$, $TiO_2$, $Y_2O_3$, ZnSe, ZnS, and $ZrO_2$ are preferred, and among these, SiO, $Ta_2O_5$, $TiO_2$, $Y_2O_3$, ZnSe, ZnS, and $ZrO_2$ are particularly preferred.

Examples of the material of the dielectric thin film having a low refractive index include $Al_2O_3$, $BiF_3$, $CaF_2$, $LaF_3$, $PbCl_2$, $PbF_2$, LiF, $MgF_2$, MgO, $NdF_3$, $SiO_2$, $Si_2O_3$, NaF, $ThO_2$, and $ThF_4$. Among these, $Al_2O_3$, $BiF_3$, $CaF_2$, $MgF_2$, MgO, $SiO_2$, and $Si_2O_3$ are preferred, and $Al_2O_3$, $CaF_2$, $MgF_2$, MgO, $SiO_2$, and $Si_2O_3$ are particularly preferred.

The material of the dielectric thin film is not particularly limited in terms of the atomic ratio, and can be appropriately selected according to the purpose. If the concentration of the atmospheric gas at the time of film formation is varied, the atomic ratio can be adjusted.

The method of forming the dielectric thin film is not particularly limited, and can be appropriately selected according to the purpose. Examples thereof include physical vapor deposition methods (PVD methods) such as ion plating, vacuum vapor deposition using ion beams, and sputtering, and chemical vapor deposition methods (CVD methods). Among these, a vacuum vapor deposition method and a sputtering method are preferred, and a sputtering method is particularly preferred.

As the sputtering method, a DC sputtering method with a high film forming rate is preferred. Moreover, in the DC sputtering method, materials having high conductivity are preferably used.

In addition, examples of the method of forming a multi-layer film through the sputtering method include (1) a 1-chamber method in which films are formed alternately or sequentially from a plurality of targets in a single chamber and (2) a multi-chamber method in which films are continuously formed in a plurality of chambers. Among these, a multi-chamber method is particularly preferred from the viewpoint of productivity and prevention of contamination of the materials.

The thickness of the dielectric thin film is preferably $\lambda/16$ to $\lambda$, more preferably $\lambda/8$ to $3\lambda/4$, and even more preferably $\lambda/6$ to $3\lambda/8$ in order of optical wavelength.

Some light rays propagated in the vapor-deposited dielectric layer undergo multiple reflection for each dielectric thin film. Due to interference of the reflected light rays, only the light having a wavelength which is determined by a product of the thickness of the dielectric thin film and the optical refractive index of the film is selectively transmitted through the vapor-deposited dielectric layer. A central transmission wavelength of the vapor-deposited dielectric layer has angle dependency with respect to the incident light, and when the incident light is varied, the transmission wavelength can be changed.

As (ii) the polarizer including a laminate of thin films having different types of birefringence, for example, a polarizer described in JP1997-506837A (JP-H9-506837A) or the like can be used.

Specifically, when processing is performed under conditions selected to obtain a refractive index relationship, it is possible to form a polarizer by using a wide variety of materials. In general, one of first materials needs to have a refractive index different from that of a second material in the selected direction. The difference in the refractive index can be achieved by various methods including stretching during or after film formation, extrusion molding, and coating. Moreover, in order to subject two materials to extrusion simultaneously, the materials preferably have similar rheological properties (for example, melt viscosity).

As the polarizer including a laminate of thin films having different types of birefringence, commercially available products can be used, and examples thereof include DBEF (trade name) manufactured by 3M Company.

(iii) The wire grid-type polarizer is a polarizer which transmits one component of polarized light and reflects the other component thereof by birefringence of fine metal wires.

The wire grid polarizer is obtained by periodically arranging metal wires, and is used as a polarizer mainly in a terahertz wavelength band. In order to allow the wire grids to function as a polarizer, it is necessary for the interval between wires to be sufficiently smaller than the wavelength of the incident electromagnetic waves.

In the wire grid polarizer, metal wires are arranged at the same intervals. A polarized light component in a polarization direction parallel to a longitudinal direction of the metal wires is reflected from the wire grid polarizer, and a polarized light component in a polarization direction perpendicular thereto is transmitted through the wire grid polarizer.

As the wire grid-type polarizer, commercially available products can be used, and examples of the commercially available products include a wire grid polarization filter 50×50, NT46-636, manufactured by Edmund Optics Inc.

Examples of the absorbing linear polarizer include (i) a polarizer having shape anisotropic metal nano-particles arranged and fixed therein, and (ii) a polarizer having a dichroic dye arranged and fixed therein.

(i) The polarizer having shape anisotropic metal nano-particles arranged and fixed therein is a polarizer in which silver halide particles or silver particles having a high aspect ratio are aligned and fixed. This polarization plate is an absorption-type linear polarization plate which absorbs light having an electric field oscillation plane in a direction of the arrangement of particles, and transmits light in a direction perpendicular to the direction of the arrangement of particles. As polarization plates belonging thereto, polarization plates disclosed in. JP1984-83951A (JP-S59-83951A), JP1990-248341A (JP-H2-248341A), and JP2003-139951A can be used.

Examples of (ii) the polarizer having a dichroic dye arranged and fixed therein include a polarization film obtained by adsorbing iodine to polyvinyl alcohol (PVA) or doping polyvinyl alcohol (PVA) with a dichroic dye, and by stretching the PVA. This is partially dehydrated and can be used as polyvinylene when being used as a polarizer in an infrared region. This polarization plate absorbs light having an electric field oscillation plane in a stretching direction, and transmits light in a direction perpendicular to the stretching direction.

This can obtain alignment of the dichroic dye by dyeing the PVA layer by passing the PVA layer in a vessel containing a dyeable composition such as iodine or an iodide, and by then stretching the film at 4 to 6-fold magnification. The conversion of the PVA to the polyvinylene can be performed through a hydrochloric acid vapor method described in U.S. Pat. No. 2,445,555A. In addition, in order to enhance the stability of the material for polarization, borating using an aqueous borating bath containing a boric acid and borax is also performed. As a product corresponding thereto, a commercially available linear polarization film for near infrared manufactured by Edmund Optics Japan Ltd. can be exemplified.

The thickness of the linearly-polarized light separating layer is preferably 0.05 µm to 300 µm, more preferably 0.2 µm to 150 µm, and even more preferably 0.5 µm to 100 µm.

($\lambda$/4 Phase Difference Layer)

The front phase difference of the $\lambda$/4 phase difference plate preferably has a length of ¼ of a wavelength (preferably central wavelength) (for example, central wavelength of emission wavelengths of a light source when the filter is used in a light source device) in the controlled wavelength region, or is "central wavelength*n±¼ of central wavelength (n is an integer)". For example, when the central wavelength of the emitted light of the light source is 1000 nm, a phase difference of 250 nm, 750 nm, 1250 nm, 1750 nm, or the like is preferred. In addition, the smaller the dependence of the phase difference on the light incidence angle, the better. In view of this, a phase difference plate having a phase difference having a length of ¼ of the central wavelength is most preferred.

The front phase difference can be measured by allowing light having a wavelength in the controlled wavelength region to enter in a normal direction of the film in a KOBRA 21ADH or WR (manufactured by Oji Scientific Instruments). When selecting a measurement wavelength, a wavelength-selective filter is manually exchanged or a measurement value is converted using a program or the like to perform the measurement.

The $\lambda$/4 wave plate is not particularly limited, and can be appropriately selected according to the purpose. Examples thereof include a stretched polycarbonate film, a stretched norbornene polymer film, a transparent film in which inorganic particles having birefringence such as strontium carbonate are contained and aligned, and a thin film obtained by obliquely depositing an inorganic dielectric on a support. In addition, examples of the $\lambda$/4 wave plate include (1) a phase difference plate in which a birefringent film having large retardation and a birefringent film having small retardation are laminated such that optical axes thereof are perpendicular to each other as described in JP1993-27118A (JP-H5-27118A) and JP1993-27119A (JP-H5-27119), (2) a phase difference plate in which a polymer film which gives a $\lambda$/4 wavelength at a specific wavelength and a polymer film which is made of the same material and gives a $\lambda$/2 wavelength at the same wavelength are laminated to obtain a $\lambda$/4 wavelength in a wide wavelength region as described in JP1998-68816A (JP-H10-68816A), (3) a phase difference plate which is capable of achieving a $\lambda$/4 wavelength in a wide wavelength region by laminating two polymer films as described in JP1998-90521A (JP-H10-90521A), (4) a phase difference plate which uses a modified polycarbonate film and is capable of achieving a $\lambda$/4 wavelength in a wide wavelength region as described in WO00/26705A, and (5) a phase difference plate which uses a cellulose acetate film and is capable of achieving a $\lambda$/4 wavelength in a wide wavelength region as described in WO00/65384A.

As such a $\lambda$/4 wave plate, commercially available products can be used, and examples thereof include Pureace WR (trade name) (manufactured by Teijin Limited.).

The circularly-polarized light separating layer can be produced by sticking the linear polarizer and the $\lambda$/4 wave plate together such that the angle of the optical axis of the $\lambda$/4 wave plate relative to the polarization absorption axis of the linear polarization plate is 45 degrees. Examples of the sticking method include a method of performing lamination of rolls using an adhesive film. When this circular polarization plate is mounted on an emission light source, the linear polarization plate is disposed and used so as to be a surface closer to the light source, and thus polarized light conversion to circularly polarized light can be performed.

The above-described phase difference plate can also be used to widen the controlled wavelength region of the circular polarizing filter of the invention, but a wide band phase difference plate is more preferably used. The wide band phase difference plate is a phase difference plate in which a phase difference angle is constant over a wide wavelength range, and examples thereof include a laminated phase difference plate which covers a wide band by laminating phase difference layers which are different in the wavelength dispersion of a birefringence index such that slow axes thereof are perpendicular to each other, a high molecular film which is formed by aligning substituents which are different in the wavelength dispersion of a birefringence index such that arrangement axes thereof are perpendicular to each other using the above principle at a molecular level, and a phase difference plate in which a layer with a phase difference of $\lambda$/2 and a layer with a phase difference of $\lambda$/4 with respect to a wavelength ($\lambda$) of a wavelength region used are laminated such that slow axes thereof intersect at 60 degrees.

The thickness of the $\lambda$/4 layer is preferably 0.2 µm to 300 µm, more preferably 0.5 µm to 150 µm, and even more preferably 1 µm to 80 µm.

(Other Layers)

The circular polarizing filter may include other layers such as a light blocking layer, a support, an alignment layer for alignment of the liquid crystal compound, and an adhesion layer for adhesion between the layers. All other layers preferably have transparency, low birefringence, and such a refractive index that the difference between the refractive index and the average refractive index (average in-plane refractive index) of the circularly-polarized light separating layer is small. In addition, other layers preferably do not have properties that offset the optical properties of the light blocking layer and the circularly-polarized light separating layer.

(Light Blocking Layer)

The circular polarizing filter may include a light blocking layer. The light blocking layer functions such that light in a wavelength region other than the specific wavelength region in which the circular polarizing filter selectively transmits either right-handed circularly polarized light or left-handed circularly polarized light is not transmitted through the filter. The light blocking layer preferably blocks natural light (unpolarized light). In addition, the light blocking layer preferably blocks all of unpolarized light, circularly polarized light, and linear polarized light. Examples of the light blocking layer include a light reflection layer and a light absorption layer.

The width of the light wavelength region in which the light blocking layer reflects or absorbs light is not particularly limited, and may be 10 nm or greater, 20 nm or greater, 30 nm or greater, 40 nm or greater, or 50 nm or greater. The light wavelength region in which light is reflected or absorbed by the blocking layer preferably includes a wavelength region of unnecessary light for uses of the circular polarizing filter. For example, when the filter is used in a sensor, a wavelength region in which unnecessary light for sensing (light interfering with sensing) is easily detected is preferably included.

In the case of a circular polarizing filter used in a sensor system, the light blocking layer may have high light reflection properties or high light absorbability in at least a part of a wavelength region excluding a detection wavelength region of a sensor (light receiving element) to be used. Otherwise, the light blocking layer may have high light reflection properties or high light absorbability in at least a part of a wavelength region excluding an emission wavelength region of a light source to be used or a light receiving region of a light receiving element.

For example, in a sensor system, when using circularly polarized light in a near infrared region, a light blocking layer having high light reflection properties or high light absorbability in at least a part of a visible light region may be used. Since silicon photodiodes which are generally used as a light receiving element (light detector) exist most frequently in the usage environment and have sensitivity up to the visible light region which is a main cause of noise, the light blocking layer preferably performs light reflection or absorption centering on the visible light region. In addition, it is preferable that the light blocking layer does not substantially reflect or absorb light in a wavelength region of near infrared light in which the circularly-polarized light separating layer selectively transmits either right-handed circularly polarized light or left-handed circularly polarized light.

The thickness of the light blocking layer is preferably 2 µm to 500 µm, more preferably 5 µm to 300 µm, and even more preferably 10 µm to 150 µm.

Hereinafter, the light reflection layer and the light absorption layer which can be used as the light blocking layer will be described.

(Light Reflection Layer)

Since the temperature of the circular polarization film rarely rises according to the use of the light reflection layer which reflects light for light blocking, durability of the circular polarizing filter increases, and thus performance is easily maintained. In general, the light reflection layer has a mirror-like appearance and gives a positive effect to the appearance of the circular polarizing filter. Accordingly, when the layer is used as a sensor component, it is readily used in a portion exposed to the human eye.

Examples of the light reflection layer include a dielectric multi-layer film and a layer having a cholesteric crystalline phase fixed therein.

(Dielectric Multi-Layer Film)

The dielectric multi-layer film is a film obtained by alternately laminating transparent dielectric layers made of an inorganic oxide or an organic polymer and having different refractive indices. At least one of these transparent dielectric layers is configured such that a product (n×d) of a thickness (d) and a refractive index (n) of the transparent dielectric layer is ¼ of a wavelength (λ) of light to be reflected, and thus can reflect light in a region with a reflection bandwidth decided to correspond to a difference in the refractive index between the dielectric layers at the central wavelength λ of the reflection. With a usual combination of materials, it is difficult to cause reflection in an entire desired wavelength region in the dielectric multi-layer film of one period in many cases. Accordingly, several types of layer with different values of n×d, which are different in the central wavelength of reflected light, may be laminated to adjust, for example, widen the reflection bandwidth. The transparent dielectric layer is not particularly limited as long as it has light transmitting properties in a specific wavelength region in which the circular polarizing filter selectively transmits either right-handed circularly polarized light or left-handed circularly polarized light.

In general, $TiO_2$, $SiO_2$, $Ta_2O_5$, and the like can be suitably used as the inorganic oxide in the dielectric multi-layer film. The layer made of the inorganic oxide can be formed through a sputtering method or the like on a surface of glass or a heat-resistant polymer film. Examples of the organic polymer material include polycarbonate, acrylic resin, polyester, epoxy resin, polyurethane, polyamide, polyolefin, and silicone (including modified silicone such as silicone polyurea), and the organic polymer material can be produced in accordance with the method disclosed in JP1997-507308A (JP-H9-507308A) or the like.

(Layer Having Cholesteric Liquid Crystalline Phase Fixed Therein: Light Reflection Layer)

The above-described layer having a cholesteric liquid crystalline phase fixed therein can be used as the light reflection layer.

The thicker the cholesteric liquid crystal layer, the higher the reflectivity at a reflection wavelength. However, in a usual liquid crystal material, when the thickness is 2 µm to 8 µm, the reflectivity is saturated in, for example, a wavelength region of visible light, and is at most 50% since circularly polarized light on only one side is reflected. In order to reflect light regardless of the sense of circularly polarized light and to adjust the natural light reflectivity to 50% or greater, a layer in which a cholesteric liquid crystal layer having a right-handed helical sense and a cholesteric liquid crystal layer having a left-handed helical sense, which have the same period P, are laminated, or a laminate formed of cholesteric liquid crystal layers having the same period P and the same helical sense and a phase difference film disposed therebetween and having a phase difference of a half wavelength with respect to a central wavelength of the circularly polarized light reflection band of the cholesteric liquid crystal layer can be used as the light reflection layer.

(Light Absorption Layer)

As the light absorption layer, a layer formed by coating a base with a dispersion liquid in which a colorant such as a pigment or a dye is dispersed in a solvent containing a dispersant, a binder, or a monomer, a layer having a polymer base with a surface directly dyed using a dye, or a layer formed from a polymer material containing a dye can be used.

As the pigment, pigments which do not cause absorption or scattering in a specific wavelength region in which the circular polarizing filter selectively transmits either right-handed circularly polarized light or left-handed circularly polarized light are preferably used. Therefore, color printing inks of cyan, magenta, yellow, and black requiring transparency, or pigments which are used in red, green, and blue color filters of liquid crystal display devices, organic LED display devices, or the like can be suitably used. By mixing these pigments which have different wavelengths at which the maximum absorption occurs, it is possible to form a layer for sufficient absorption in an entire desired wavelength region other than the specific wavelength region.

As the dye, a dye which does not cause absorption at a specific wavelength region in which the circular polarizing filter selectively transmits either right-handed circularly polarized light or left-handed circularly polarized light, and is durable against light exposure is preferably used. General direct dyes, acid dyes, basic dyes, mordant dyes, disperse dyes, reactive dyes, and the like can be used. As this dye-type absorption layer, commercially available photographic filters IR-80, IR-82, IR-84, and the like (manufactured by Fujifilm Corporation) can be used.

(Light Absorption Layer Provided on Surface in Thickness Direction of Circular Polarizing Filter)

The circular polarizing filter may have the light absorption layer on a surface in the thickness direction (side surface). A layer produced in the same manner using the same material as in the light absorption layer as the above-described light blocking layer can be used as the light absorption layer, but the light absorption layer provided on the surface in the thickness direction may absorb light in a specific wavelength region in which the circular polarizing filter selectively transmits either circularly polarized light or left-handed circularly polarized light.

Some or all of the surfaces in the thickness direction may be used. For example, when the circular polarizing filter has a rectangular or square shape, all four surfaces thereof may be used, or only one to three surfaces of the rectangular or square circular polarizing filter may be used. For example, the light absorption layer may be provided only on a surface in which the quantity of incident light from a side surface (surface in thickness direction) is significant.

(Support)

The support is not particularly limited. The support which is used to form the circularly-polarized light separating layer may be a temporary support which is peeled off after the formation of the circularly-polarized light separating layer. When the support is a temporary support, it does not constitute the circular polarizing filter, and thus there are no limits related to optical properties such as the above-described transparency and refringence.

Glass and the like may be used as the support (temporary support) in addition to a plastic film. Examples of the plastic film include polyester such as polyethylene terephthalate (PET), polycarbonate, acrylic resin, epoxy resin, polyurethane, polyamide, polyolefin, cellulose derivative, and silicone.

The thickness of the support may be about 5 µm to 1000 µm, is preferably 10 µm to 250 µm, and is more preferably 15 µm to 90 µm.

(Alignment Film)

The alignment film can be provided with means such as a rubbing treatment of an organic compound or a polymer (resins such as polyimide, polyvinyl alcohol, polyester, polyarylate, polyamide-imide, polyether-imide, polyamide, and modified polyamide), oblique deposition of an inorganic compound, formation of a layer having a microgroove, or accumulation of an organic compound (for example, ω-tricosanoic acid, dioctadecylmethylammonium chloride, methyl stearate) by a Langmuir-Blodgett method (LB film). Furthermore, an alignment film which generates an alignment function by application of an electric field, application of a magnetic field, or light irradiation is also known.

Particularly, an alignment film formed of a polymer is preferably subjected to a rubbing treatment, and then subjected to the application of a composition for forming a liquid crystal layer to the rubbed surface. The rubbing treatment can be performed by rubbing a surface of a polymer layer with paper or cloth a plurality of times in a constant direction.

Without providing the alignment film, a liquid crystal composition may be applied to a support surface or a rubbed surface of the support.

Furthermore, a material obtained by applying and curing an acrylic monomer, gelatin, a urethane monomer, or the like is preferred as the alignment film material for forming the reflected light-scattering circularly-polarized light separating layer. For example, an acrylic layer obtained by applying and curing a (meth)acrylate monomer-containing layer is isotropic in the plane, and thus when a liquid crystal layer is formed without performing a rubbing treatment on a surface of the acrylic layer, the liquid crystal which is in contact with the acrylic layer has a random in-plane alignment direction. Therefore, a cholesteric liquid crystal layer formed by applying a liquid crystal composition to the surface of the acrylic layer can be regarded as a layer having alignment defects. When a liquid crystal layer is formed on the liquid crystal layer having alignment defects, a liquid crystal layer having alignment defects similar thereto can be formed.

In addition, as the alignment film material for forming the reflected light-scattering circularly-polarized light separating layer, a resin such as polyimide (polyimide varnish Sunever 130 manufactured by Nissan Chemical Industries, Ltd.), polyvinyl alcohol, polyester, polyacrylate, polyamideimide, polyetherimide, polyamide, or modified polyamide may be used. In order to form a cholesteric liquid crystal layer having high scattering reflectance, it is preferable that a rubbing treatment (for example, a rubbing treatment which is performed by rubbing a surface of a polymer layer with paper or cloth in a constant direction) is not performed on a surface of the transparent layer to which the liquid crystal composition is applied.

The thickness of the alignment layer is preferably 0.01 µm to 5 µm, and more preferably 0.05 µm to 2 µm.

(Adhesion Layer)

The adhesion layer may be formed from an adhesive.

From the viewpoint of the curing method, examples of the adhesive include hot melt types, thermosetting types, photocurable types, reactive curing types, and pressure sensitive adhesion types which are not required to be cured, and as materials thereof, compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds can be used. From the viewpoint of workability and productivity, photocurable types are preferred in terms of the curing method, and from the viewpoint of optical transparency and heat resistance, acrylate compounds, urethane acrylate compounds, epoxy acrylate compounds, and the like are preferably used in terms of the material.

(Uses of Circular Polarizing Filter)

The circular polarizing filter of the invention is a circular polarizing filter for selectively transmitting circularly polarized light of any one sense of either right-handed circularly polarized light or left-handed circularly polarized light at a specific wavelength. In general, the circular polarizing filter of the invention can selectively reflect circularly polarized light of any one sense of either right-handed circularly polarized light or left-handed circularly polarized light at the specific wavelength, but the uses of the circular polarizing filter of the invention preferably have a form of using transmitted light. The uses of the circular polarizing filter are not particularly limited, and the circular polarizing filter can be used in light source devices, sensors, optical members, sheets for plant cultivation (agricultural sheets), projectors, and the like. Examples of the light source devices include light source devices which are used for plant cultivation and light source devices which are used in sensor systems using polarized light. The circular polarizing filter of the invention is also preferably used as a sensor system by combining a light source and a light receiving element. Examples of the object which can be detected by the sensor system include a crack or a scratch on a transparent (birefringent) film or a specular reflector (metal plate or the like) and foreign substances on a specular reflector. The sensor system may also be used as a motion sensor for security for people such as night pedestrians and a motion sensor of an automatic door, an elevator, or the like.

(Light Source, Light Source Device)

As the light source, a light source which can irradiate the filter with light of the specific wavelength may be used. Even when the light source itself emits light of the specific wavelength, the light source may be adjusted so as to apply light of the specific wavelength according to the filter or the like. As the light source, any of a halogen lamp, a tungsten lamp, an LED, an LD, a xenon lamp, a metal halide lamp, and the like can be used. An LED or an LD is preferred in view of small size, light-emitting directivity, monochromatic light, and pulse modulation suitability.

When a light source device is constituted by combining a light source and the above-described circular polarizing filter, the light source device preferably has a configuration in which, for example, the light source is provided in a housing and the circular polarizing filter is disposed in a light emitting portion such that light other than light passing via the circular polarizing filter is not emitted from the light source. When the circularly-polarized light separating layer includes a reflected light-non-scattering circularly-polarized light separating layer, the light source, the reflected light-non-scattering circularly-polarized light separating layer, and the reflected light-scattering circularly-polarized light separating layer may be arranged in this order. When the light source device has a light blocking layer, the light blocking layer may be disposed on the light source side or on the outside when viewed from the circularly-polarized light separating layer, but is preferably disposed on the outside.

(Sensor, Light Receiving Element)

As the light receiving element, a detector in which photodiode-type sensors or light detection elements using a semiconductor such as Si, Ge, HgCdTe, PtSi, InSb, and PbS are linearly arranged, and the light receiving element includes a CCD and a CMOS capable of capturing an image.

In the sensor using the circular polarizing filter of the invention, a light receiving element which can detect light of the specific wavelength may be used.

The circular polarizing filter may be disposed on, for example, the light receiving surface of a sensor.

When the circular polarizing filter and the light receiving element are used as a sensor in an integrated manner, the sensor preferably has a configuration in which the light receiving element is provided in a housing and the circular polarizing filter is disposed in a light capturing portion such that light other than light passing via the circular polarizing filter does not reach the light receiving element. When the circularly-polarized light separating layer includes a reflected light-non-scattering circularly-polarized light separating layer, the light receiving element, the reflected light-non-scattering circularly-polarized light separating layer, and the reflected light-scattering circularly-polarized light separating layer may be arranged in this order. When the sensor has a light blocking layer, the light blocking layer may be disposed on the light receiving element side or on the outside when viewed from the circularly-polarized light separating layer, but is preferably disposed on the outside.

(Use of Circular Polarizing Filter in Sensor System)

Examples of the arrangement of an object to be detected, a light source, a light receiving element, and a circular polarizing filter are shown in FIG. 1 as examples of the usage of the circular polarizing filter of the invention in a sensor system.

In Arrangement 1, a light source, a circular polarizing filter on the light source side (may be referred to as circular polarizing filter 1 in this description), an object, a circular polarizing filter on the light receiving element side (may be referred to as circular polarizing filter 2 in this description), and a light receiving element are arranged in this order, and light transmitted through the object is detected. At this time, as the object, a transparent film (particularly, transparent film having birefringence) or the like is considered. For example, this arrangement can be used to detect the passing of film in a film manufacturing line. In Arrangement 1, glass is disposed between the object and the circular polarizing filter 1 (1 in FIG. 1) and between the object and the circular polarizing filter 2 (1 in FIG. 1), and according to the usage of the circular polarizing filter of the invention, the influence of light reflected from the glass can be significantly reduced.

Arrangements 2 to 4 are configurations for detecting reflected light, and are configurations in which the circular polarizing filter 1 doubles as the circular polarizing filter 2, that is, the circular polarizing filter 1 and the circular polarizing filter 2 are the same. In Arrangements 2 to 4, the light source and the light receiving element are arranged on the same side surface side of the circular polarizing filter (1 in FIG. 1) when viewed from the object. In this configuration, a light blocking layer or the like may be provided between the light receiving element and the light source as shown in FIG. 1 such that the light receiving element is not directly influenced by light from the light source.

Arrangement 2 shows an example in which a transparent film (particularly, transparent film having birefringence) is the object. Glass is disposed between the object and the circular polarizing filter, and according to the usage of the circular polarizing filter of the invention, the influence of light reflected from the glass can be significantly reduced.

In Arrangement 3, paper on a specular reflector is detected. This example uses the fact that since light converted into circularly polarized light of any one sense via the circular polarizing filter (1 in FIG. 1) is reflected as circularly polarized light of the other sense from the specular reflector, the light cannot reach the light receiving element through the circular polarizing filter, but light irregularly reflected by the paper includes a light component which can be transmitted through the circular polarizing filter.

Arrangement 4 shows an example in which foreign substances or a crack of the specular reflector is detected as the object, but its detection (sensing) principle is the same as that of Arrangement 3.

Arrangement 5 is a configuration for detecting reflected light, and shows an example in which different films are used as the circular polarizing filter 1 and the circular polarizing filter 2. In such a usage example, the light source (2 in FIG. 1) and the circular polarizing filter 1 (1 in FIG. 1)

may be formed integrally with each other to constitute the light source device, or the light receiving element (3 in FIG. 1) and the circular polarizing filter 2 (1 in FIG. 1) may be formed integrally with each other to constitute the sensor. In the example shown in FIG. 1, people are detected with Arrangement 5. For example, night pedestrians or people in an elevator can be preferably detected with this arrangement.

Regarding the circular polarizing filter, due to an optical path in which the circular polarizance becomes the highest based on the properties of the cholesteric liquid crystal layer, the position of the light source or the light receiving element or the position of the object is preferably adjusted with respect to the circular polarizing filter as necessary in order to further raise the circular polarizance or to raise the accuracy of the sensor when using the circular polarizing filter of the invention.

EXAMPLES

Hereinafter, the invention will be described in more detail using examples. The materials, reagents, amounts and proportions of substances, operations, and the like shown in the following examples may be appropriately modified without departing from the gist of the invention. The scope of the invention is, therefore, not limited to the following examples.

Example 1

A polyimide varnish Sunever 130 manufactured by Nissan Chemical Industries, Ltd. was applied with a thickness of 0.2 µm on a glass substrate, and then heated for 1 hour at 250° C. to form a substrate with an attached alignment film. On this surface, a coating liquid A-1 shown in Table 1 was applied by using a wire bar at room temperature such that a thickness of the dried film after drying was 4.4 µm. After being dried for 30 seconds at room temperature, the coating layer was heated for 2 minutes under an atmosphere at 85° C., and then UV-irradiated for 6 seconds to 12 seconds using a D-bulb (lamp 90 mW/cm) manufactured by Heraeus K.K. Noblelight Division with an output of 60% at 30° C. to obtain a circular polarizing filter of Example 1.

Examples 2 to 4

Circular polarizing filters of Examples 2 to 4 were obtained in the same manner as in Example 1, except that the thickness of the dried film after drying was 2.7 µm, 1.8 µm, and 1.0 µm, respectively, by adjusting the wire bar number and the solvent amount.

Example 5

To the glass substrate with an attached alignment film produced in the same manner as in Example 1, a coating liquid A-2 shown in Table 1 was applied by using a wire bar at room temperature such that a thickness of the dried film after drying was 5.0 µm. After being dried for 30 seconds at room temperature, the coating layer was heated for 2 minutes under an atmosphere at 85° C., and then UV-irradiated for 6 seconds to 12 seconds using a D-bulb (lamp 90 mW/cm) manufactured by Heraeus K.K. Noblelight Division with an output of 60% at 30° C. to fix a cholesteric liquid crystal layer. Thus, a circularly-polarized light separating layer was obtained.

To a film IR80 manufactured by Fujifilm Corporation as a visible light absorption layer, a UV-curable adhesive Exp. U12034-6 manufactured by DIC Corporation was applied by using a wire bar at room temperature such that the thickness of the dried film after drying was 5 µm. This coating surface and the surface on the liquid crystal layer side of the circularly-polarized light separating layer produced as described above were stuck together so as to prevent air bubbles from entering therebetween, and then UV-irradiated for 6 seconds to 12 seconds using a D-bulb (lamp 90 mW/cm) manufactured by Heraeus K.K. Noblelight Division with an output of 60% at 30° C. Thereafter, the circularly-polarized light separating layer with the attached visible light absorption layer was peeled off from the glass plate acting as a support of the circularly-polarized light separating layer, and thus a circular polarizing filter of Example 5 was obtained.

Example 6

A circular polarizing filter of Example 6 with an attached glass cover was obtained by setting a circularly-polarized light separating layer with an attached visible light absorption layer produced in the same manner as in Example 5 on a circular plastic filter holder, and by installing a glass plate having a thickness of 1.1 mm on the circularly-polarized light separating layer side at a distance of 1 mm from the circularly-polarized light separating layer.

Example 7

A circular polarizing filter of Example 7 with an attached glass cover was obtained by setting a circularly-polarized light separating layer produced in the same manner as in Example 1 on a circular plastic filter holder, and by installing a pair of 1.1 mm-thick glass plates, opposed to each other in parallel with an interval of 1 mm interposed therebetween, at a distance of 1 mm from the circularly-polarized light separating layer.

Comparative Example 1

A circular polarizing filter of Comparative Example 1 was obtained in the same manner as in Example 1, except that a surface of the alignment film was subjected to a rubbing treatment.

Comparative Example 2

A circular polarizing filter of Comparative Example 2 was obtained in the same manner as in Example 5, except that a surface of the alignment film was subjected to a rubbing treatment.

Comparative Example 3

A circular polarizing filter of Comparative Example 3 with an attached glass cover was obtained by setting a circularly-polarized light separating layer with an attached visible light absorption layer produced in the same manner as in Comparative Example 2 on a circular plastic filter holder, and by installing a glass plate having a thickness of 1.1 mm on the circularly-polarized light separating layer side at a distance of 1 mm from the circularly-polarized light separating layer.

Comparative Example 4

A circular polarizing filter of Comparative Example 4 was obtained in the same manner as in Example 5, except that a surface of the alignment film was subjected to a rubbing treatment and the visible light absorption layer IR80 was not adhered.

Comparative Example 5

A circular polarizing filter of Comparative Example 5 with an attached glass cover was obtained by setting a circularly-polarized light separating layer produced in the same manner as in Comparative Example 1 on a circular plastic filter holder, and by installing a glass plate having a thickness of 1.1 mm on the circularly-polarized light separating layer side at a distance of 1 mm from the circularly-polarized light separating layer.

(Measurement of Vertical Transmittance, 5° Regular Reflectance, Scattering Transmittance, and Scattering Reflectance)

The vertical transmittance and the 5° regular reflectance were measured using a combination of a spectrophotometer V-670 manufactured by Jasco Inc. and an absolute reflectance measurement unit ARV474S, and the transmittance and the reflectance measured over the whole angle were measured using a combination of V-670 and an integrating sphere unit ISN723. The vertical transmittance was a value measured at an incidence angle of 0°, and the reflectance was a value measured at an incidence angle of 5°. The scattering rate was calculated by subtracting the vertical transmittance and the regular reflectance from the integrating sphere measured over the whole angle.

When measuring the vertical transmittance, the 5° regular reflectance, the scattering transmittance, and the scattering reflectance of left-handed circularly polarized light, these were measured by installing, on the light source side, a unit obtained by fixing an achromatic wavelength plate manufactured by Edmund Optics Japan Ltd. on a linear polarization film for near infrared manufactured by Edmund Optics Japan Ltd. such that the angle formed in the plane between a high-speed axis and an absorption axis of the polarization film was 45 degrees. At this time, the measurement was performed by installing the polarization film and the wavelength plate in this order from the light source side. At this time, a circular polarizance was measured by positioning the polarization plate on the light incident side, and thus the polarization plate was confirmed to be a left-handed circular polarization plate (polarization plate transmitting left-handed circularly polarized light).

When measuring the vertical transmittance, the 5° regular reflectance, the scattering transmittance, and the scattering reflectance of right-handed circularly polarized light, these were measured in the same manner by installing, on the light source side, a unit obtained by rotating an achromatic wavelength plate manufactured by Edmund Optics Japan Ltd. by 90° with respect to the above fixing position and by fixing the achromatic wavelength plate on a linear polarization film for near infrared manufactured by Edmund Optics Japan Ltd.

(Measurement of Circular Polarizance)

Figure 2:
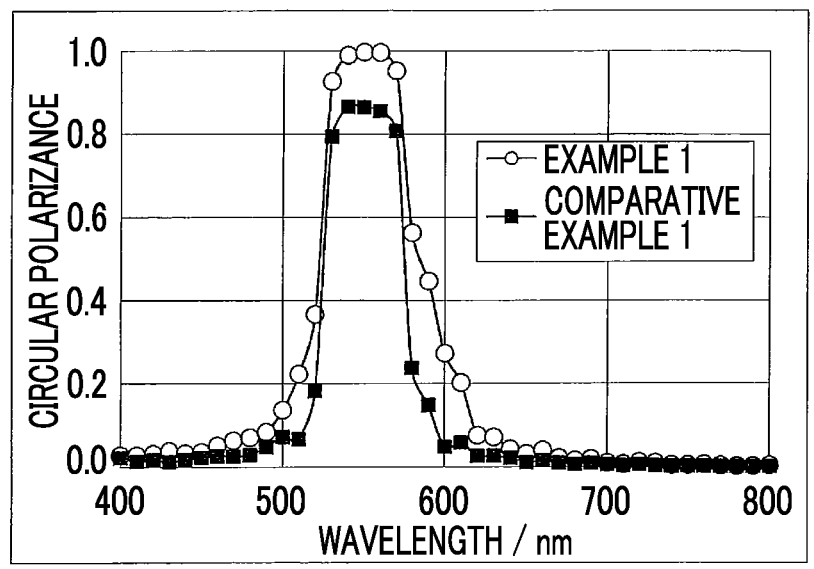
FIG. 2 is a diagram showing graphs of circular polarizances of Example 1 and Comparative Example 1 at wavelengths of 400 nm to 800 nm.

Circular polarizances of the circular polarizing filters of Examples 1 to 7 and Comparative Examples 1 to 5 were measured. In the circular polarizance measurement, in the cases of the samples (Examples 1 to 4 and 7 and Comparative Examples 1 and 5) of which the selective reflection wavelength was 400 nm to 800 nm, a circular polarizance was measured with a wavelength step of 5 nm using an AxoScan of Axometrix in an arrangement in which measurement light entered from the circularly-polarized light separating layer side. In the measurement of the circular polarizance of a sample of which the selective reflection wavelength was out of the above wavelength region, a circular polarization plate obtained by combining a linear polarization plate and a phase difference plate of a first quarter wavelength with respect to the selective reflection wavelength was installed on the detector side to measure light intensities of a right-handed circularly polarized light component and a left-handed circularly polarized light component included in the transmitted light with the use of a visible/ultraviolet/near infrared transmissive spectrometer. In the measurement, the inclination of the sample filter with respect to the light source and the detector was adjusted such that the maximum light transmittance was reached. The results of the measurement of the maximum circular polarizances are shown in Table 2. Graphs of the circular polarizances of Example 1 and Comparative Example 1 at a wavelength of 400 nm to 800 nm are shown in FIG. 2.

(Evaluation of Performance as Circular Polarizing Filter for Photoelectric Sensor)

Figure 4:
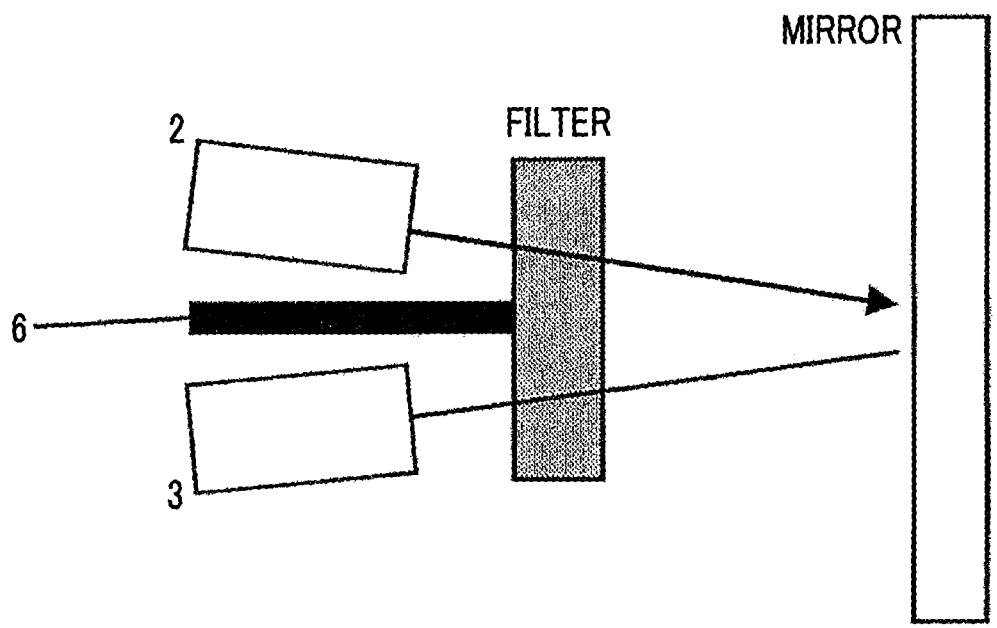
FIG. 4 is a diagram schematically showing the arrangement of a filter, a light source, a light receiving element, and a mirror used in the examples.

The circular polarizing filters of Examples 1 to 7 and Comparative Examples 1 to 5, a mirror, a light source (KED880S4 manufactured by Kyosemi Corporation), and a light receiving element (KS1364 manufactured by Shinko Denshi Co., Ltd.) were arranged as shown in FIG. 4. Regarding the filters, a filter having a visible light absorption layer was disposed such that the circularly-polarized light separating layer was positioned on the mirror side with respect to the visible light absorption layer, and a filter having a glass cover was disposed such that the glass cover was positioned on the mirror side. The evaluation was performed in a manner such that unpolarized light of a central wavelength of 880 nm was applied from the light source to the mirror via the filter, and the light reflected from the mirror and transmitted through the filter was detected by the light receiving element. In the measurement, the inclination and the position of the mirror were adjusted such that the light intensity detected at the mirror position when the filter was installed was the maximum. The value of the light intensity measured when no filter was installed was set to 100, and the evaluation was performed by correcting the value measured when the filter was installed. The lower the value, the better effect was obtained. The evaluation criteria are as follows. The measurement was performed in a state in which the light was completely blocked in the dark room and an incandescent lamp was turned on in the light room. The results are shown in Table 2.

AA: 0 to 3
A: 3 to 10
B: 10 to 25
C: 25 to 50
D: 50 to 100
E: 100 or greater

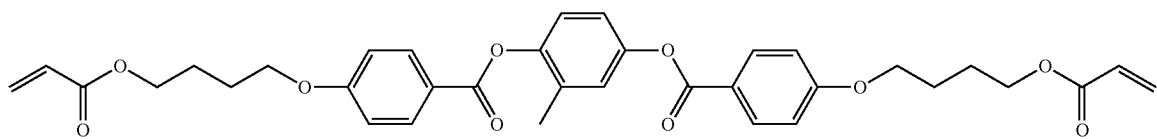
Compound 1

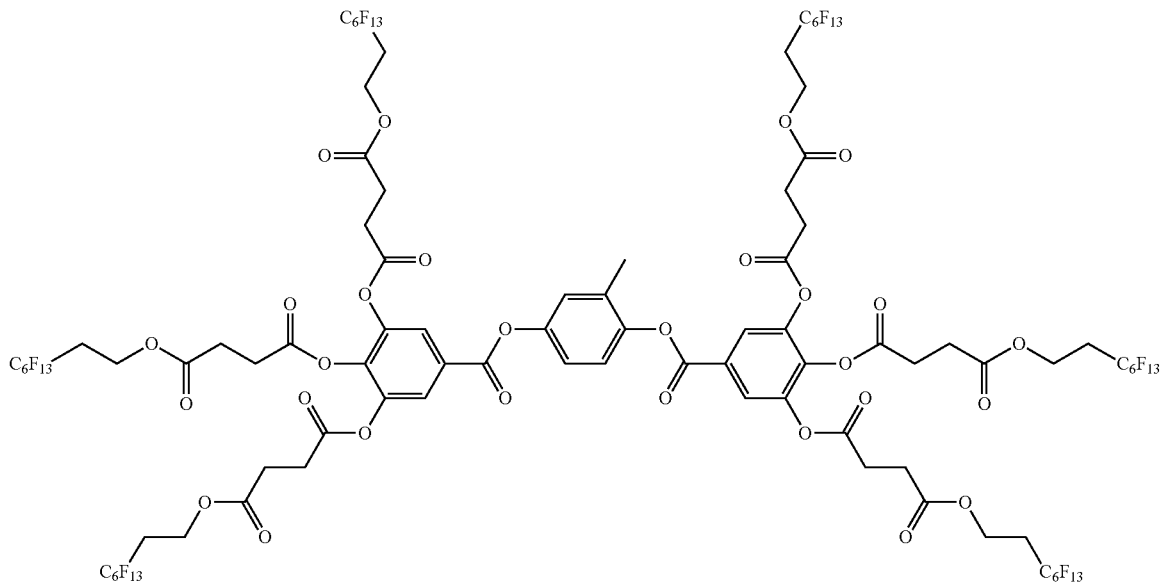
Compound 2

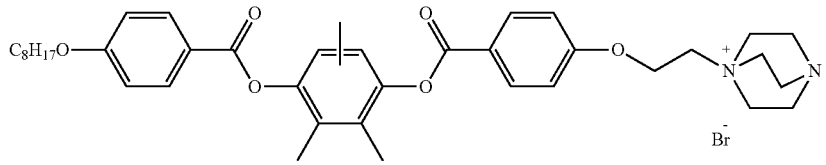
Compound 3

TABLE 1

| Material (type) | Name of Material (Manufacturer) | Name of Coating Liquid | | | |
|---|---|---|---|---|---|
| | | A-1 | A-2 | A-3 | A-4 |
| Liquid Crystalline Compound | Compound 1 | 100 parts by mass | 100 parts by mass | 100 parts by mass | 100 parts by mass |
| Polymerization Initiator | Irg-819 (Ciba Specialty Chemicals Corporation) | 4 parts by mass | 4 parts by mass | 4 parts by mass | 4 parts by mass |
| Air Interface Side Alignment Control Agent | Compound 2 | 0.5 parts by mass | 0.5 parts by mass | 0.5 parts by mass | 0 part by mass |
| Alignment Film-Side Control Agent | Compound 3 | 0 part by mass | 0 part by mass | 0.02 parts by mass | 0 part by mass |
| Chiral Agent | LC-756 (BASF) | 5.5 parts by mass | 3.4 parts by mass | 5.5 parts by mass | 5.5 parts by mass |
| Solvent | 2-Butanone (Wako Pure Chemical Industries, Ltd.) | Appropriate Adjustment According to Film Thickness | Appropriate Adjustment According to Film Thickness | Appropriate Adjustment According to Film Thickness | Appropriate Adjustment According to Film Thickness |

TABLE 2

| Example | Coating Liquid | Alignment Film | Liquid Crystal Alignment Lower Surface Direction | Liquid Crystal Alignment Lower Surface Tilt | Liquid Crystal Alignment Upper Surface Tilt | Central Wavelength of Selective Reflection | Thickness of Film | Light Blocking Layer | Installation of Glass on Front Surface | Left-Scattering Transmittance/ Vertical Transmittance | Right-Scattering Reflectance/ Regular Reflectance | Circular Polarization | Sensor Evaluation Light Environment | Sensor Evaluation Dark Environment |
|---|---|---|---|---|---|---|---|---|---|---|---|---|---|---|
| 1 | A-1 | PI | Random | Horizontal | Horizontal | 550 nm | 4.4 μm | None | None | 0.06 | 3.8 | 1 | | |
| 2 | A-1 | PI | Random | Horizontal | Horizontal | 550 nm | 2.7 μm | None | None | 0.06 | 3.9 | 0.99 | | |
| 3 | A-1 | PI | Random | Horizontal | Horizontal | 550 nm | 1.8 μm | None | None | 0.05 | 4 | 0.98 | | |
| 4 | A-1 | PI | Random | Horizontal | Horizontal | 550 nm | 1 μm | None | None | 0.04 | 4.5 | 0.93 | | |
| 5 | A-2 | PI | Random | Horizontal | Horizontal | 880 nm | 5 μm | IR80 | None | 0.04 | 4.1 | 0.99 | AA | AA |
| 6 | A-2 | PI | Random | Horizontal | Horizontal | 880 nm | 5 μm | IR80 | One piece of glass | 0.04 | 4.1 | 0.99 | AA | AA |
| 7 | A-1 | PI | Random | Horizontal | Horizontal | 550 nm | 4.4 μm | None | Two pieces of glass | 0.06 | 3.8 | 1 | | |

| Comparative Example | Coating Liquid | Alignment Film | Lower Surface Direction | Lower Surface Tilt | Upper Surface Tilt | Central Wavelength | Thickness | Light Blocking | Glass on Front | Left-Scattering/Vertical | Right-Scattering/Regular | Circular Polarization | Light Environment | Dark Environment |
|---|---|---|---|---|---|---|---|---|---|---|---|---|---|---|
| 1 | A-1 | PI | Uniaxial Alignment | Horizontal | Horizontal | 550 nm | 4.4 μm | None | None | 0 | 0.01 | 0.87 | | |
| 2 | A-2 | PI | Uniaxial Alignment | Horizontal | Horizontal | 880 nm | 5 μm | IR80 | None | 0.01 | 0.01 | 0.87 | A | A |
| 3 | A-2 | PI | Uniaxial Alignment | Horizontal | Horizontal | 880 nm | 5 μm | IR80 | One piece of glass | 0.01 | 0.01 | 0.77 | B | B |
| 4 | A-2 | PI | Uniaxial Alignment | Horizontal | Horizontal | 880 nm | 5 μm | None | One piece of glass | 0.01 | 0.01 | 0.77 | C | B |
| 5 | A-1 | PI | Uniaxial Alignment | Horizontal | Horizontal | 550 nm | 4.4 μm | None | Two pieces of glass | 0.01 | 0.01 | 0.69 | | |

Comparative Example 11

In order to align a liquid crystal, a PET manufactured by Fujifilm Corporation was subjected to a rubbing treatment, and a coating liquid A-1 shown in Table 3 was applied to the treated surface by using a wire bar at room temperature such that the thickness of the dried film after drying was 5 μm. After being dried for 30 seconds at room temperature, the coating layer was heated for 2 minutes under an atmosphere at 85° C., and then UV-irradiated for 6 seconds to 12 seconds using a D-bulb (lamp 90 mW/cm) manufactured by Heraeus K.K. Noblelight Division with an output of 60% at 30° C. to obtain a liquid crystal layer. When a liquid crystal layer is formed on a liquid crystal layer having no alignment defects, the liquid crystal layer becomes a liquid crystal layer having no alignment defects similar thereto. Accordingly, a coating liquid A-2 shown in Table 3 was applied to the liquid crystal layer at room temperature such that the thickness of the dried film after drying was 5 μm, and then drying, heating, and UV irradiation were performed in the same manner as in the above description to form a second liquid crystal layer, whereby a reflected light-non-scattering circularly-polarized light separating layer was obtained. The fact that the reflected light-non-scattering circularly-polarized light separating layer has no alignment defects was confirmed with a polarizing microscope. Then, the PET manufactured by Fujifilm Corporation, acting as a support of the reflected light-non-scattering circularly-polarized light separating layer, was peeled off to obtain a circular polarizing filter of Comparative Example 11.

Example 11

A coating liquid B shown in Table 4 was applied to a surface of a PET manufactured by Fujifilm Corporation by using a wire bar at room temperature such that the thickness of the dried film after drying was 8 μm. After being dried for 30 seconds at room temperature, the coating layer was heated for 2 minutes under an atmosphere at 85° C., and then UV-irradiated for 6 seconds to 12 seconds using a D-bulb (lamp 90 mW/em) manufactured by Heraeus K.K. Noblelight Division with an output of 60% at 30° C. to obtain an acrylic layer. No rubbing treatment was performed on this acrylic layer, and the coating liquid A-1 shown in Table 3 was applied thereto at room temperature such that the thickness of the dried film after drying was 5 μm. Thereafter, drying, heating, and UV irradiation were performed in the same manner as in the above description to obtain a liquid crystal layer. When a liquid crystal layer is formed on a liquid crystal layer having alignment defects, the liquid crystal layer becomes a liquid crystal layer having alignment defects similar thereto. Accordingly, the coating liquid A-2 shown in Table 3 was applied to the liquid crystal layer at room temperature such that the thickness of the dried film after drying was 5 µm, and then drying, heating, and UV irradiation were performed in the same manner as in the above description to form a second liquid crystal layer, whereby a reflected light-scattering circularly-polarized light separating layer was obtained. The fact that the reflected light-scattering circularly-polarized light separating layer has alignment defects was confirmed with a polarizing microscope.

Sticking of Reflected Light-Scattering Circularly-polarized light separating layer and Reflected light-non-scattering circularly-polarized light separating layer To the surface on the liquid crystal side of the reflected light-scattering circularly-polarized light separating layer produced as described above, a UV-curable adhesive Exp. U12034-6 manufactured by DIC Corporation was applied by using a wire bar at room temperature such that the thickness of the dried film after drying was 5 µm. This coating surface and the surface on the liquid crystal layer side of the reflected light-non-scattering circularly-polarized light separating layer produced in Comparative Example 11 were stuck together so as to prevent air bubbles from entering therebetween, and were then UV-irradiated for 6 seconds to 12 seconds using a D-bulb (lamp 90 mW/cm) manufactured by Heraeus K.K. Noblelight Division with an output of 60% at 30° C. Thereafter, the PET manufactured by Fujifilm Corporation, acting as a support of the reflected light-scattering circularly-polarized light separating layer and the reflected light-non-scattering circularly-polarized light separating layer, was peeled off to obtain a circular polarizing filter of Example 11.

Example 12

The coating liquid B shown in Table 4 was applied to a surface of a PET manufactured by Fujifilm Corporation by using a wire bar at room temperature such that the thickness of the dried film after drying was 8 µm. After being dried for 30 seconds at room temperature, the coating layer was heated for 2 minutes under an atmosphere at 85° C., and then UV-irradiated for 6 seconds to 12 seconds using a D-bulb (lamp 90 mW/cm) manufactured by Heraeus K.K. Noblelight Division with an output of 60% at 30° C. to obtain an acrylic layer. No rubbing treatment was performed on this acrylic layer, and the coating liquid A-1 shown in Table 3 was applied thereto at room temperature such that the thickness of the dried film after drying was 4.5 µm. Thereafter, drying, heating, and UV irradiation were performed in the same manner as in the above description to obtain a liquid crystal layer. The coating liquid A-2 shown in Table 3 was applied to this liquid crystal layer at room temperature such that the thickness of the dried film after drying was 4.5 µm. Thereafter, drying, heating, and UV irradiation were performed in the same manner as in the above description to form a second liquid crystal layer, whereby a reflected light-scattering circularly-polarized light separating layer was obtained.

The reflected light-scattering circularly-polarized light separating layer produced as described above and a reflected light-non-scattering circularly-polarized light separating layer which was the same as the reflected light-non-scattering circularly-polarized light separating layer produced in Comparative Example 11 were stuck together in the same manner as in Example 11, and thus a circular polarizing filter of Example 12 was obtained.

Comparative Example 12

The coating liquid B shown in Table 4 was applied to a surface of a PET manufactured by Fujifilm Corporation by using a wire bar at room temperature such that the thickness of the dried film after drying was 8 µm. After being dried for 30 seconds at room temperature, the coating layer was heated for 2 minutes under an atmosphere at 85° C., and then UV-irradiated for 6 seconds to 12 seconds using a D-bulb (lamp 90 mW/cm) manufactured by Heraeus K.K. Noblelight Division with an output of 60% at 30° C. to obtain an acrylic layer. No rubbing treatment was performed on this acrylic layer, and a coating liquid A-3 shown in Table 3 was applied thereto at room temperature such that the thickness of the dried film after drying was 5 µm. Thereafter, drying, heating, and UV irradiation were performed in the same manner as in the above description to obtain a liquid crystal layer. A coating liquid A-4 shown in Table 3 was applied to this liquid crystal layer at room temperature such that the thickness of the dried film after drying was 5 µm. Thereafter, drying, heating, and UV irradiation were performed in the same manner as in the above description to form a second liquid crystal layer, whereby a reflected light-scattering circularly-polarized light separating layer was obtained.

The reflected light-scattering circularly-polarized light separating layer produced as described above and a reflected light-non-scattering circularly-polarized light separating layer which was the same as the reflected light-non-scattering circularly-polarized light separating layer produced in Comparative Example 11 were stuck together in the same manner as in Example 11, and thus a circular polarizing filter of Comparative Example 12 was obtained.

Comparative Example 13

A coating liquid C shown in Table 5 was applied to the surface on the liquid crystal layer side of the reflected light-non-scattering circularly-polarized light separating layer obtained in Comparative Example 11 by using a wire bar at room temperature such that the thickness of the dried film after drying was 10 µm. After being dried for 30 seconds at room temperature, the coating layer was heated for 2 minutes under an atmosphere at 85° C., and then UV-irradiated for 6 seconds to 12 seconds using a D-bulb (lamp 90 mW/cm) manufactured by Heraeus K.K. Noblelight Division with an output of 60% at 30° C. Thereafter, the PET manufactured by Fujifilm Corporation, acting as a support of the reflected light-non-scattering circularly-polarized light separating layer, was peeled off to obtain a circular polarizing filter of Comparative Example 13.

Example 13

The coating liquid B shown in Table 4 was applied to a surface of a PET manufactured by Fujifilm Corporation by using a wire bar at room temperature such that the thickness of the dried film after drying was 8 µm. After being dried for 30 seconds at room temperature, the coating layer was heated for 2 minutes under an atmosphere at 85° C., and then UV-irradiated for 6 seconds to 12 seconds using a D-bulb (lamp 90 mW/cm) manufactured by Heraeus K.K. Noblelight Division with an output of 60% at 30° C. to obtain an acrylic layer. No rubbing treatment was performed on this acrylic layer, and a coating liquid A-5 shown in Table 3 was applied thereto at room temperature such that the thickness of the dried film after drying was 5 μm. Thereafter, drying, heating, and UV irradiation were performed in the same manner as in the above description to obtain a liquid crystal layer. A coating liquid A-6 shown in Table 3 was applied to this liquid crystal layer at room temperature such that the thickness of the dried film after drying was 5 μm. Thereafter, drying, heating, and UV irradiation were performed in the same manner as in the above description to form a second liquid crystal layer, whereby a reflected light-scattering circularly-polarized light separating layer was obtained.

The coating liquid A-5 shown in Table 3 was applied to a rubbed surface of a PET manufactured by Fujifilm Corporation subjected to a rubbing treatment by using a wire bar at room temperature such that the thickness of the dried film after drying was 5 μm. After being dried for 30 seconds at room temperature, the coating layer was heated for 2 minutes under an atmosphere at 85° C., and then UV-irradiated for 6 seconds to 12 seconds using a D-bulb (lamp 90 mW/cm) manufactured by Heraeus K.K. Noblelight Division with an output of 60% at 30° C. to obtain a liquid crystal layer. The coating liquid A-6 shown in Table 3 was applied to this liquid crystal layer at room temperature such that the thickness of the dried film after drying was 5 μm. Thereafter, drying, heating, and UV irradiation were performed in the same manner as in the above description to form a second liquid crystal layer, whereby a reflected light-non-scattering circularly-polarized light separating layer was obtained.

The reflected light-scattering circularly-polarized light separating layer produced as described above and the reflected light-non-scattering circularly-polarized light separating layer were stuck together in the same manner as in Example 11, and thus a circular polarizing filter of Example 13 was obtained.

Example 14

A coating liquid D shown in Table 6 was spin-applied to a rubbed surface of a PET manufactured by Fujifilm Corporation subjected to a rubbing treatment at a rotation speed of 2000 rpm. After being dried for 30 seconds at room temperature, the coating layer was heated for 2 minutes under an atmosphere at 85° C., and then UV-irradiated for 6 seconds to 12 seconds using a D-bulb (lamp 90 mW/cm) manufactured by Heraeus K.K. Noblelight Division with an output of 60% at 30° C. to form a phase difference film.

The phase difference of this phase difference film was measured using an AxoScan of Axometrix within a range of 400 nm to 800 nm, and using these values, a phase difference at 880 nm was obtained through an extrapolation method. The phase difference was 220 nm To a phase difference film surface of this film, a UV-curable adhesive Exp. U12034-6 manufactured by DIC Corporation was applied by using a wire bar at room temperature such that the thickness of the dried film after drying was 5 μm. A linear polarization film for near infrared manufactured by Edmund Optics Japan Ltd. was stuck such that the angle formed in the plane between an alignment axis of the liquid crystal molecules and an absorption axis of the polarization plate was 45 degrees, and thus a reflected light-non-scattering circularly-polarized light separating layer was formed. Using the AxoScan, this reflected light-non-scattering circularly-polarized light separating layer was subjected to the measurement of the circular polarizance by positioning the polarization plate on the light incident side, and thus the polarization plate was confirmed to be a right-handed circular polarization plate.

A reflected light-scattering circularly-polarized light separating layer which was the same as the reflected light-scattering circularly-polarized light separating layer produced in Example 11 was stuck to the surface of the phase difference film of the reflected light-non-scattering circularly-polarized light separating layer produced as described above in the same manner as in Example 11, and thus a circular polarizing filter of Example 14 was obtained.

Example 15

To the surface on the liquid crystal layer side of the reflected light-scattering circularly-polarized light separating layer produced in Example 11, a UV-curable adhesive Exp. U12034-6 manufactured by DIC Corporation was applied by using a wire bar at room temperature such that the thickness of the dried film after drying was 5 μm. This coating surface and the surface on the reflected light-non-scattering circularly-polarized light separating layer side of the circular polarizing filter produced in Example 11 were stuck together so as to prevent air bubbles from entering therebetween, and were then UV-irradiated for 6 seconds to 12 seconds using a D-bulb (lamp 90 mW/cm) manufactured by Heraeus K.K. Noblelight Division with an output of 60% at 30° C. Thereafter, the PET manufactured by Fujifilm Corporation, acting as a support of the reflected light-scattering circularly-polarized light separating layer, was peeled off to obtain a circular polarizing filter of Example 15.

Example 16

To IR80 manufactured by Fujifilm Corporation, a UV-curable adhesive Exp. U12034-6 manufactured by DIC Corporation was applied by using a wire bar at room temperature such that the thickness of the dried film after drying was 5 μm. This coating surface and the surface on the reflected light-non-scattering circularly-polarized light separating layer side of the circular polarizing filter produced in Example 11 were stuck together so as to prevent air bubbles from entering therebetween, and were then UV-irradiated for 6 seconds to 12 seconds using a D-bulb (lamp 90 mW/cm) manufactured by Heraeus K.K. Noblelight Division with an output of 60% at 30° C. to obtain a filter. Thereafter, to the side of the IR80, manufactured by Fujifilm Corporation, of the filter produced as described above, a UV-curable adhesive Exp. U12034-6 manufactured by DIC Corporation was applied by using a wire bar at room temperature such that the thickness of the dried film after drying was 5 μm. This coating surface and the surface on the reflected light-non-scattering circularly-polarized light separating layer side of the circular polarizing filter produced in Example 11 were stuck together so as to prevent air bubbles from entering therebetween, and were then UV-irradiated for 6 seconds to 12 seconds using a D-bulb (lamp 90 mW/cm) manufactured by Heraeus K.K. Noblelight Division with an output of 60% at 30° C. to obtain a circular polarizing filter of Example 16.

Example 17

To one surface of the circular polarizing filter produced in Example 16, an adhesive Arontack S-1511 Modified manufactured by Toagosei Co., Ltd. was applied by using a wire bar at room temperature such that the thickness of the dried film after drying was 5 μm. This coating surface and an acrylic plate (flat plate (Product No. 001) manufactured by Nitto Jushi Kogyo Co., Ltd.) having a thickness of 0.3 mm were stuck together so as to prevent air bubbles from entering therebetween. Then, to a surface on the other side, an adhesive Arontack S-1511 manufactured by Toagosei Co., Ltd. was applied by using a wire bar at room temperature such that the thickness of the dried film after drying was 5 µm. This coating surface and an acrylic plate (flat plate (Product No. 001) manufactured by Nitto Jushi Kogyo Co., Ltd.) having a thickness of 0.4 mm were stuck together so as to prevent air bubbles from entering therebetween, and thus a circular polarizing filter of Example 17 was obtained.

(Measurement of Circularly Polarized Light Transmittance)

Figure 3:
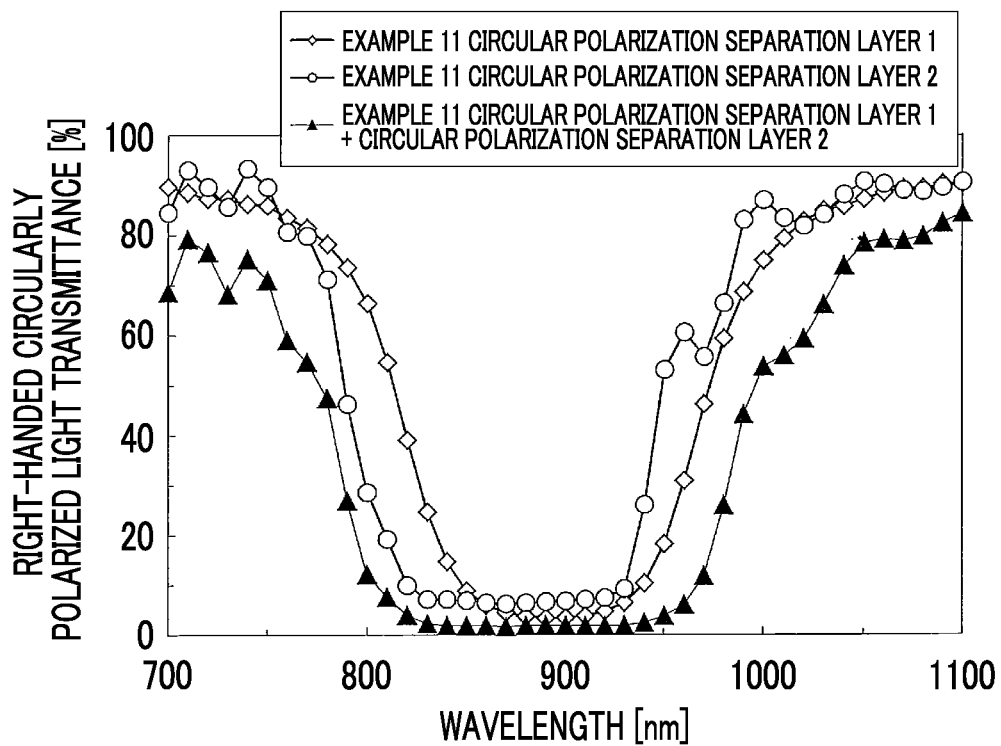
FIG. 3 shows graphs showing left-handed circularly polarized light transmittances when using only a reflected light-scattering circularly-polarized light separating layer, when using only a reflected light-non-scattering circularly-polarized light separating layer, and when using a laminate of the reflected light-scattering circularly-polarized light separating layer and the reflected light-non-scattering circularly-polarized light separating layer in Example 11.

The circularly polarized light transmittances of only the reflected light-scattering circularly-polarized light separating layer, only the reflected light-non-scattering circularly-polarized light separating layer, and the laminate of the reflected light-scattering circularly-polarized light separating layer and the reflected light-non-scattering circularly-polarized light separating layer in Example 11 were measured within a wavelength range of 700 nm to 1100 nm. In the laminate, measurement light entered from the surface of the reflected light-non-scattering circularly-polarized light separating layer. The measurement was performed using a combination of a spectrophotometer V-670 manufactured by Jasco Inc. and an absolute reflectance measurement unit ARV474S with a wavelength step of 10 nm in a manner such that a vertical transmittance was measured by installing, on the light source side, a unit obtained by fixing an achromatic wavelength plate manufactured by Edmund Optics Japan Ltd. on a linear polarization film for near infrared manufactured by Edmund Optics Japan Ltd. such that the angle formed in the plane between a high-speed axis and an absorption axis of the polarization film was 45 degrees. At this time, the measurement was performed by installing the polarization film and the wavelength plate in this order from the light source side. At this time, a circular polarizance was measured by positioning the polarization plate on the light incident side, and thus the polarization plate was confirmed to be a right-handed circular polarization plate (polarization plate transmitting right-handed circularly polarized light). In the measurement, the position of the circularly-polarized light separating layer was adjusted such that the angle between the optical axis and the circularly-polarized light separating layer was 90°. The results of the measured circularly polarized light transmittances are shown in FIG. 3.

Film Evaluation Method

The reflected light-scattering circularly-polarized light separating layers and the reflected light-non-scattering circularly-polarized light separating layers of the produced circular polarizing filters of Examples 11 to 17 and Comparative Examples 11 to 13 were evaluated with the following items.

(2-1) Vertical Transmittance, 5° Regular Reflectance, Scattering Transmittance, and Scattering Reflectance:

The measurement was performed in the same manner as in the above-described measurement of the vertical transmittances, the 5° regular reflectances, the scattering transmittances, and the scattering reflectances of the circular polarizing filters of Examples 1 to 7 and Comparative Examples 1 to 5.

(Evaluation of Performance as Circular Polarizing Filter for Photoelectric Sensor)

The produced circular polarizing filters of Examples 11 to 17 and Comparative Examples 11 to 13, a mirror, a light source (KED880S4 manufactured by Kyosemi Corporation), and a light receiving element (KS1364 manufactured by Shinko Denshi Co., Ltd.) were arranged as shown in FIG. 4. The filters of Examples 11 to 14 and Comparative Examples 12 and 13 were disposed such that the reflected light-scattering circularly-polarized light separating layer was positioned on the mirror side, and the filter of Example 17 was disposed such that the acrylic plate having a thickness of 0.4 mm was positioned on the mirror side (In Examples 15 and 16, any surface may be disposed on the mirror side due to the front-back symmetrical laminated structure).

The evaluation was performed in a manner such that unpolarized light of a central wavelength of 880 nm was applied from the light source to the mirror via the filter, and the light reflected from the mirror and transmitted through the filter was detected by the light receiving element. In the measurement, the inclination and the position of the mirror were adjusted such that the light intensity detected at the mirror position when the filter was installed was the maximum. The value of the light intensity measured when no filter was installed was set to 100, and the evaluation was performed by correcting the value measured when the filter was installed. In order to prevent disturbance, the measurement was performed in a state in which ambient light was completely blocked.

The evaluation standards are as follows. The results are shown in Table 7.

A: 0 to 5
B: 6 to 15
C: 16 to 100

TABLE 3

| | | Coating Liquid (A) | | | |
|---|---|---|---|---|---|
| Material (type) | Name of Material (Manufacturer) | Coating Liquid A-1 | Coating Liquid A-2 | Coating Liquid A-3 | Coating Liquid A-4 |
| Liquid Crystalline Compound | Compound 1 | 100 parts by mass | 100 parts by mass | 100 parts by mass | 100 parts by mass |
| Polymerization Initiator | Irg-819 (Ciba Specialty Chemicals Corporation) | 4 parts by mass | 4 parts by mass | 4 parts by mass | 4 parts by mass |
| Alignment Control Agent | Compound 12 | 0.03 parts by mass | 0.03 parts by mass | 0 part by mass | 0 part by mass |
| Chiral Agent | LC-756 (BASF) | 3.5 parts by mass | 3.3 parts by mass | 3.5 parts by mass | 3.3 parts by mass |

TABLE 3-continued

Coating Liquid (A)

| Solvent | 2-Butanone (Wako Pure Chemical Industries, Ltd.) | Appropriate Adjustment According to Film Thickness | Appropriate Adjustment According to Film Thickness | Appropriate Adjustment According to Film Thickness | Appropriate Adjustment According to Film Thickness |
|---|---|---|---|---|---|

| Material (type) | Name of Material (Manufacturer) | Coating Liquid A-5 | Coating Liquid A-6 |
|---|---|---|---|
| Liquid Crystalline Compound | Compound 1 | 100 parts by mass | 100 parts by mass |
| Polymerization Initiator | Irg-819 (Ciba Specialty Chemicals Corporation) | 4 parts by mass | 4 parts by mass |
| Alignment Control Agent | Compound 12 | 0.03 parts by mass | 0.03 parts by mass |
| Chiral Agent | Compound 13 | 5.5 parts by mass | 5.2 parts by mass |
| Solvent | 2-Butanone (Wako Pure Chemical Industries, Ltd.) | Appropriate Adjustment According to Film Thickness | Appropriate Adjustment According to Film Thickness |

TABLE 4

Coating Liquid B

| Material (type) | Name of Material (Manufacturer) | Coating Liquid B |
|---|---|---|
| Acryl | Biscoat 360 (manufactured by Osaka Organic Chemical Industry, Ltd.) | 100 parts by mass |
| Polymerization Initiator | Irg-819 (Ciba Specialty Chemicals Corporation) | 4 parts by mass |
| Surfactant | Compound 12 | 0.03 parts by mass |
| Solvent | 2-Butanone (Wako Pure Chemical Industries, Ltd.) | Appropriate Adjustment According to Film Thickness |

TABLE 5

Coating Liquid C

| Material (type) | Name of Material (Manufacturer) | Coating Liquid C |
|---|---|---|
| Acryl | PET-30 (manufactured by Nippon Kayaku Co., Ltd.) | 19.1 parts by mass |
| Acryl | Biscoat 360 (manufactured by Osaka Organic Chemical Industry, Ltd.) | 19.1 parts by mass |
| Polymerization Initiator | Irg-819 (Ciba Specialty Chemicals Corporation) | 1.5 parts by mass |
| Thickener | CAB-531-1 (manufactured by Eastman Chemical Company) | 0.72 parts by mass |
| Particles | 8 μm Crosslinked Acryl-Styrene Particles (manufactured by Sekisui Chemical Co., Ltd.) | 7.17 parts by mass |
| Surfactant | Compound 14 | 0.055 parts by mass |
| Solvent | 2-Butanone (Wako Pure Chemical Industries, Ltd.) | 18.63 parts by mass |
| Solvent | Methyl Isobutyl Ketone (Wako Pure Chemical Industries, Ltd.) | 33.83 parts by mass |

TABLE 6

Coating Liquid D

| Material (type) | Name of Material (Manufacturer) | Coating Liquid D |
|---|---|---|
| Liquid Crystalline Compound | Compound 1 | 100 parts by mass |
| Polymerization Initiator | Irg-819 (Ciba Specialty Chemicals Corporation) | 4 parts by mass |
| Alignment Control Agent | Compound 12 | 0.03 parts by mass |
| Solvent | 2-Butanone (Wako Pure Chemical Industries, Ltd.) | Appropriate Adjustment According to Film Thickness |

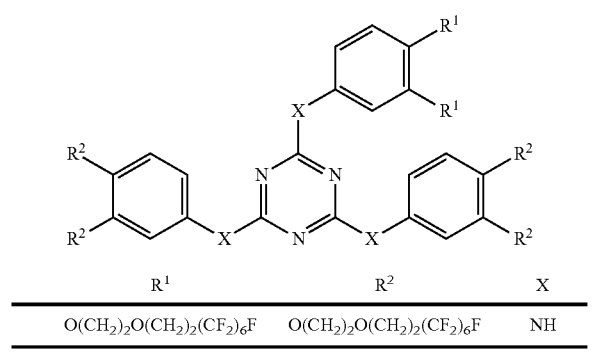

Compound 12: Compound described in JP2005-99248A

| R¹ | R² | X |
|---|---|---|
| O(CH$_2$)$_2$O(CH$_2$)$_2$(CF$_2$)$_6$F | O(CH$_2$)$_2$O(CH$_2$)$_2$(CF$_2$)$_6$F | NH |

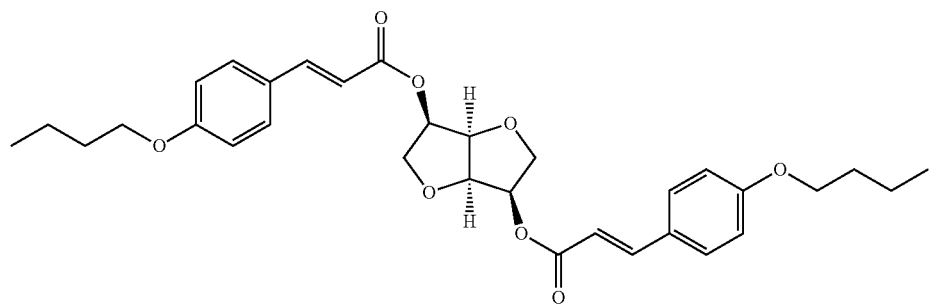

Compound 13

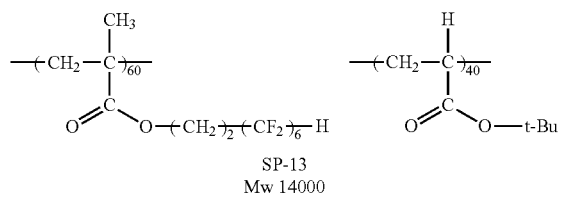

Compound 14

SP-13
Mw 14000

From the fact that the circular polarizance is improved even in a configuration in which glass is installed over the whole surface, even a problem that the circular polarizance of light passing through cover glass, a plastic window material, or the like installed to protect the circular polarizing filter is further reduced is thought to be greatly improved by using the circular polarizing filter of the invention.

EXPLANATION OF REFERENCES

1: circular polarizing filter
2: light source
3: light receiving element (detector)
4: object

TABLE 7

| | Reflected Light-Scattering Circularly-polarized light separating layer | | | | Reflected light-non-scattering circularly-polarized light separating layer | | | | | |
|---|---|---|---|---|---|---|---|---|---|---|
| | Method | Twist Right or Left | Left-Scattering Transmittance/ Left-Vertical Transmittance | Right-Scattering Reflectance/ Right-Regular Reflectance | Method | Twist Right or Left | Left-Scattering Transmittance/ Left-Vertical Transmittance | Right-Scattering Reflectance/ Right-Regular Reflectance | Determination | |
| Comparative Example 1 | — | — | — | — | Cholesteric | Right | 0.00 | 0.00 | 19 | C |
| Example 1 | Cholesteric | Right | 0.05 | 3.44 | Cholesteric | Right | 0.00 | 0.00 | 4 | A |
| Example 2 | Cholesteric | Right | 0.06 | 4.12 | Cholesteric | Right | 0.00 | 0.00 | 5 | A |
| Comparative Example 2 | Cholesteric | Right | 0.17 | 5.19 | Cholesteric | Right | 0.00 | 0.00 | 12 | B |
| Comparative Example 3 | AG Film | — | 0.25 | 0.61 | Cholesteric | Right | 0.00 | 0.00 | 16 | C |
| Example 3 | Cholesteric | Left | 0.07 | 3.56 | Cholesteric | Left | 0.00 | 0.00 | 4 | A |
| Example 4 | Cholesteric | Right | 0.05 | 3.44 | λ/4 + Linear Polarization Plate | Right | 0.00 | 0.00 | 4 | A |
| Example 5 | Cholesteric | Right | 0.05 | 3.44 | Cholesteric | Right | 0.00 | 0.00 | 4 | A |
| Example 6 | Cholesteric | Right | 0.05 | 3.44 | Cholesteric | Right | 0.00 | 0.00 | 2 | A |
| Example 7 | Cholesteric | Right | 0.05 | 3.44 | Cholesteric | Right | 0.00 | 0.00 | 2 | A |

5: transparent glass
6: light blocking layer

What is claimed is:

1. A circular polarizing filter for selectively transmitting circularly polarized light of any one sense of either right-handed circularly polarized light or left-handed circularly polarized light at a specific wavelength, the filter comprising:
a circularly-polarized light separating layer which selectively transmits circularly polarized light of any one sense of either right-handed circularly polarized light or left-handed circularly polarized light, and selectively reflects circularly polarized light of the other sense at the specific wavelength,
wherein the circularly-polarized light separating layer includes a reflected light-scattering circularly-polarized light separating layer,
the reflected light-scattering circularly-polarized light separating layer is composed of a layer having a cholesteric liquid crystalline phase fixed therein, and
a ratio of scattering transmittance to vertical transmittance when circularly polarized light of such a sense as to be selectively transmitted at the specific wavelength enters from any one surface is less than a ratio of scattering reflectance to regular reflectance when circularly polarized light of the other sense enters from the surface at the specific wavelength in the circular polarizing filter,
wherein the ratio of scattering reflectance to regular reflectance when circularly polarized light of the other sense enters from the surface at the specific wavelength is 2.0 to 7.5.

2. The circular polarizing filter according to claim 1,
wherein the reflected light-scattering circularly-polarized light separating layer has alignment defects of the cholesteric liquid crystalline phase therein, and
the ratio of scattering transmittance to vertical transmittance of the circularly polarized light of the sense at the specific wavelength is less than the ratio of scattering reflectance to regular reflectance of circularly polarized light of the other sense in the reflected light-scattering circularly-polarized light separating layer.

3. The circular polarizing filter according to claim 1,
wherein the ratio of scattering transmittance to vertical transmittance when circularly polarized light of such a sense as to be selectively transmitted at the specific wavelength enters from any one surface is 0.00 to 0.10.

4. The circular polarizing filter according to claim 1,
wherein in the reflected light-scattering circularly-polarized light separating layer, the ratio of scattering transmittance to vertical transmittance of circularly polarized light of such a sense as to be selectively transmitted at the specific wavelength is 0.00 to 0.10, and the ratio of scattering reflectance to regular reflectance of circularly polarized light of the other sense at the specific wavelength is 2.0 to 7.5.

5. The circular polarizing filter according to claim 1,
wherein in the reflected light-scattering circularly-polarized light separating layer, a haze value measured using natural light of the specific wavelength is greater than 10 and 55 or less.

6. The circular polarizing filter according to claim 1,
wherein a liquid crystal compound forming the cholesteric liquid crystalline phase is horizontally aligned on at least one surface side of the reflected light-scattering circularly-polarized light separating layer.

7. The circular polarizing filter according to claim 1,
wherein the reflected light-scattering circularly-polarized light separating layer is a layer made from a composition containing a liquid crystal compound applied to a film surface not subjected to a rubbing treatment and an air interface alignment agent.

8. The circular polarizing filter according to claim 1,
wherein the circularly-polarized light separating layer includes a reflected light-non-scattering circularly-polarized light separating layer, and
the reflected light-non-scattering circularly-polarized light separating layer is a layer which selectively transmits circularly polarized light of any one sense of either right-handed circularly polarized light or left-handed circularly polarized light at the specific wavelength, and selectively reflects circularly polarized light of the other sense, the reflected light-scattering circularly-polarized light separating layer and the reflected light-non-scattering circularly-polarized light separating layer are the same as each other in terms of the sense of circularly polarized light to be selectively transmitted, and in the reflected light-non-scattering circularly-polarized light separating layer, a ratio of scattering transmittance to vertical transmittance of circularly polarized light of such a sense as to be selectively transmitted at the specific wavelength is 0.00 to 0.05, and a ratio of scattering reflectance to regular reflectance of circularly polarized light of the other sense at the specific wavelength is 0.00 to 0.05.

9. The circular polarizing filter according to claim 8,
wherein in the reflected light-scattering circularly-polarized light separating layer, a haze value measured using natural light of the specific wavelength is greater than 10 and 55 or less, and in the reflected light-non-scattering circularly-polarized light separating layer, a haze value measured using natural light of the specific wavelength is 1.0 or less.

10. The circular polarizing filter according to claim 8,
wherein the reflected light-non-scattering circularly-polarized light separating layer is composed of a layer having a cholesteric liquid crystalline phase fixed therein.

11. The circular polarizing filter according to claim 8,
wherein the reflected light-non-scattering circularly-polarized light separating layer is composed of a laminate of a linearly-polarized light separating layer and a layer functioning as a $\lambda/4$ phase difference layer at the specific wavelength.

12. A light source device comprising:
the circular polarizing filter according to claim 8; and
a light source capable of applying light of the specific wavelength,
wherein the light source, the reflected light-non-scattering circularly-polarized light separating layer, and the reflected light-scattering circularly-polarized light separating layer are arranged in this order.

13. A sensor comprising:
the circular polarizing filter according to claim 8; and
a light receiving element capable of detecting light of the specific wavelength,
wherein the light receiving element, the reflected light-non-scattering circularly-polarized light separating layer, and the reflected light-scattering circularly-polarized light separating layer are arranged in this order.

14. A sensor system comprising:
the circular polarizing filter according to claim 8;
a light source capable of applying light of a wavelength within the specific wavelength region; and
a light receiving element capable of detecting light of a wavelength within the specific wavelength region, wherein the light source, the reflected light-non-scattering circularly-polarized light separating layer, and the reflected light-scattering circularly-polarized light separating layer are arranged in this order, and the light receiving element, the reflected light-non-scattering circularly-polarized light separating layer, and the reflected light-scattering circularly-polarized light separating layer are arranged in this order.

15. The circular polarizing filter according to claim 1, wherein the specific wavelength is within a range of 800 nm to 1500 nm.

16. The circular polarizing filter according to claim 15, further comprising:
a light blocking layer which blocks light in a wavelength region with a width of 50 nm or greater of 380 nm to 780 nm.

17. The circular polarizing filter according to claim 1, further comprising:
a light blocking layer which blocks light in at least a part of a wavelength region not including the specific wavelength.

18. A light source device comprising:
the circular polarizing filter according to claim 1; and
a light source capable of applying light of the specific wavelength.

19. A sensor comprising:
the circular polarizing filter according to claim 1; and
a light receiving element capable of detecting light of the specific wavelength.

20. A sensor system comprising:
the circular polarizing filter according to claim 1;
a light source capable of applying light of the specific wavelength; and
a light receiving element capable of detecting light of the specific wavelength.

* * * * *